(12) United States Patent
Miyawaki et al.

(10) Patent No.: US 6,783,241 B2
(45) Date of Patent: Aug. 31, 2004

(54) PROJECTION-TYPE DISPLAY DEVICE

(75) Inventors: Tetsuyuki Miyawaki, Kanagawa (JP); Hideki Yamamoto, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/039,329

(22) Filed: Oct. 22, 2001

(65) Prior Publication Data
US 2002/0122157 A1 Sep. 5, 2002

Related U.S. Application Data

(63) Continuation of application No. 09/404,020, filed on Sep. 23, 1999.

(30) Foreign Application Priority Data

| Sep. 29, 1998 | (JP) | P10-275370 |
| Sep. 30, 1998 | (JP) | P10-276974 |
| Oct. 23, 1998 | (JP) | P10-301953 |

(51) Int. Cl.[7] .............................................. G03B 21/14
(52) U.S. Cl. ............................. 353/20; 353/31; 349/5
(58) Field of Search ....................... 353/20, 31, 33, 353/34, 37; 349/5, 7, 8, 9

(56) References Cited

U.S. PATENT DOCUMENTS

| 5,327,270 A | 7/1994 | Miyatake |
| 5,621,486 A | 4/1997 | Doany et al. |
| 5,648,860 A | 7/1997 | Ooi et al. |
| 5,786,934 A | 7/1998 | Chiu et al. |
| 5,808,795 A | 9/1998 | Shimomura et al. |
| 5,918,961 A | 7/1999 | Ueda |
| 5,986,815 A | 11/1999 | Bryars |
| 6,082,861 A | 7/2000 | Dove et al. |
| 6,089,717 A | 7/2000 | Iwai |
| 6,111,700 A | 8/2000 | Kobayashi et al. |
| 6,123,424 A | 9/2000 | Hayashi et al. |
| 6,179,423 B1 | 1/2001 | Kato et al. |

FOREIGN PATENT DOCUMENTS

| EP | 0671854 A1 | 3/1995 |
| JP | 07218723 | 8/1995 |
| JP | 9-113863 | 5/1997 |

*Primary Examiner*—William C. Dowling
(74) *Attorney, Agent, or Firm*—Bell, Boyd & Lloyd LLC

(57) ABSTRACT

A projection-type display device which is used in a projector device for projecting optical images spatially modulated by reflection-type liquid crystal panels onto a screen to display an image, wherein a wavelength separation mirror is arranged so that an angle exhibited by an optical axis of light incident on the wavelength separation mirror and the optical axis of reflected light becomes smaller than 90 degrees or polarization filters or polarization separation elements are arranged on an incident facet side or an emission facet side of optical separation elements.

7 Claims, 12 Drawing Sheets

112,113

PROJECTION-TYPE DISPLAY DEVICE

This application is a continuation of U.S. patent application Ser. No. 09/404,020 filed on Sep. 23, 1999.

BACKGROUND OF THE INVENTION

1. Field of the Invention

The present invention relates to a projection-type display device which can be applied to for example a projector device for projecting an optical image spatially modulated by a reflection-type liquid crystal panel onto a screen.

2. Description of the Related Art

In the related art, a projection-type display device has been proposed which is configured to use a reflection-type liquid crystal panel to generate a spatially modulated optical image and to project this optical image onto the screen so as to form a desired color image.

FIG. 1 is a view of the configuration of this type of projection-type display device.

In this projection-type display device 1, a light source 2 is constituted by for example a discharge lamp 3 and a reflector 4 and emits white illumination light. A convex lens 5 converts the illumination light emitted from the light source 2 to a substantially parallel luminous flux and then emits it.

A color separation mirror 6 on the optical path of the illumination light emitted from this convex lens 5 reflects the illumination light having a predetermined wavelength and transmits the remaining illumination light therethrough. A color separation mirror 7 on the optical path of the illumination light reflected at this color separation mirror 6 reflects the illumination light having a predetermined wavelength and transmits the remaining illumination light therethrough. Due to this, the projection-type display device 1 separates the illumination light emitted from the light source 2 to red, blue, and green illumination light.

A lens 8, a mirror 9, and a lens 10 bend the optical path of the illumination light transmitted through the color separation mirror 6 to guide the light to a polarization beam splitter 11. The polarization beam splitter 11 emits illumination light having a predetermined plane polarization in the illumination light striking from this lens 10 toward a reflection-type liquid crystal panel 12 and transmits the illumination light having a plane polarization orthogonal to this plane polarization. Further, the polarization beam splitter 11 transmits a predetermined polarization component in the optical image emitted after spatially modulating the illumination light at the reflection-type liquid crystal panel 12 and emits it to a color synthesizing prism 13.

A polarization beam splitter 14 similarly emits the illumination light having a predetermined plane polarization in the illumination light reflected at the color separation mirror 7 toward the reflection-type liquid crystal panel 15 and transmits the illumination light having the plane polarization orthogonal to this plane polarization therethrough. Further, the polarization beam splitter 14 transmits a predetermined polarization component in the optical image emitted after spatially modulation of the illumination light at the reflection-type liquid crystal panel 15 therethrough and emits it to the color synthesizing prism 13.

A polarization beam splitter 16 similarly emits the illumination light having a predetermined plane polarization in the illumination light reflected at the color separation mirror 7 toward the reflection-type liquid crystal panel 17 and transmits the illumination light having a plane polarization orthogonal to this plane polarization therethrough. Further, the polarization beam splitter 16 transmits a predetermined polarization component in the optical image emitted after spatially modulation of the illumination light at the reflection-type liquid crystal panel 17 therethrough and emits it to the color synthesizing prism 13.

The reflection-type liquid crystal panels 12, 15, and 17 spatially modulate the illumination light according to color signals corresponding to the wavelengths of the incident illumination light by being driven by a not illustrated drive circuit and project optical images rotated in their plane polarizations with respect to the illumination light toward the polarization beam splitters 11, 14, and 16.

The color synthesizing prism 13 combines the optical images incident from these polarization beam splitters 11, 14, and 16 and emits the result. A projection lens 19 projects the resultant optical image emitted from this color synthesizing prism 13 onto the screen 20.

Due to this, the projection-type display device 1 enlarges and projects the images formed on the reflection-type liquid crystal panels 12, 15, and 17 onto the screen 20 to thus display the intended color image.

The polarization beam splitters 11, 14, and 16 used for this type of projection-type display device 1, however, also reflect and emit several percent of the amount of light incident of the components of plane polarization which originally must be transmitted. In the projection-type display device 1, therefore, the unrequired plane polarization components reflected at the polarization beam splitters 11, 14, and 16 in this way are returned from the reflection-type liquid crystal panels 12, 15, and 17 to the polarization beam splitters 11, 14, and 16 and projected onto the screen 20 via the color synthesizing prism 13.

Further, unmodulated components which are never polarized, but are reflected are also contained also in the modulated light reflected at the reflection-type liquid crystal panels 12, 15, and 17. In the projection-type display device 1, such components are also projected onto the screen 20 via the color synthesizing prism 13.

Due to this, the projection-type display device 1 suffers from the defect of the haze phenomenon where a portion which should be originally displayed black is displayed white, so there is a problem that the contrast of the display image is still insufficient by that amount in practical use and the quality of the display image is poor.

Below, this haze phenomenon will be further considered from the viewpoint of the structure of the polarization beam splitter.

When a black portion is displayed white and this haze phenomenon is manifested, the contrast cannot be sufficiently secured by that amount in the image displayed on the screen.

A polarization beam splitter is formed by adhering inclined facets of rectangular prisms to each other. The incident light is detected by a laminate of dielectric films at the inclined facets. Accordingly, in the transmitted light and the reflected light of the polarization beam splitter, originally the linear polarized light resulting from this detection must be emitted.

The glass material constituting this type of rectangular prism, however, has a birefringence property. Due to this, the reflected light and the transmitted light to be originally emitted by the linear polarization are emitted by elliptical polarization.

Namely, the reflected light and the transmitted light comes to contain light having a plane polarization orthogonal to the plane polarization originally aimed at. Further, the light incident due to linear polarization comes to be detected by elliptical polarization, therefore part of the light to be originally transmitted or reflected will be reflected or transmitted by that amount and emitted reverse to the former.

When viewing this from the standpoint of the optical images emitted toward the polarization beam splitters from the reflection-type liquid crystal panels, the reflection-type liquid crystal panels spatially modulate the incident light having the predetermined plane polarizations and reflect optical images as the synthesized light of p-polarization components and s-polarization components. The optical images emitted in this way originally must be separated into the p-polarization components and the s-polarization components by the polarization beam splitters and only the optical images of the p-polarization components projected onto the screen.

However, the optical images become elliptical polarized light due to the birefringence of the polarization beam splitters. As a result, part of the s-polarization components subjected to no spatial modulation will be projected onto the screen.

Further, when viewing the illumination light emitted from the polarization beam splitters toward the reflection-type liquid crystal panels, the components of the plane polarization orthogonal to the illumination light having the predetermined plane polarization to be spatially modulated at the reflection-type liquid crystal panels will leak in. This leaked illumination light will be projected onto the screen as it is.

Note that, if the above haze phenomenon nonuniformly occurs, the image displayed in the projection-type display device 1 will deteriorate in uniformity.

SUMMARY OF THE INVENTION

An object of the present invention is to provide a projection-type display device capable of displaying a high quality display image by improving the contrast.

According to a first aspect of the present invention, there is provided a projection-type display device, comprising at least a first reflection-type image-forming means for spatially modulating and reflecting an incident first illumination light to emit a first optical image, a second reflection-type image-forming means for spatially modulating and reflecting an incident second illumination light to emit a second optical image, a wavelength separation mirror for reflecting illumination light of a predetermined wavelength in incident light and emitting it as the first illumination light to the first reflection-type image-forming means and transmitting the remaining illumination light and emitting it as the second illumination light to the second reflection-type image-forming means so as to reflect the first optical image and transmit the second optical image and emit the first and second optical images so as to follow the optical path of the incident light in reverse, a projection optical system for projecting the first and second optical images, a light source for emitting predetermined light to the wavelength separation mirror as the incident light, and a light separating means for emitting the incident light emitted from the light source to the wavelength separation mirror and emitting the first and second optical images incident from the wavelength separation mirror to the projection optical image, the inclination of the wavelength separation mirror set so that the optical axis of the light incident on the wavelength separation mirror and the optical axis of the first optical image becomes smaller than 90 degrees.

According to a second aspect of the present invention, there is provided a projection-type display device, comprising at least a first reflection-type image-forming means for spatially modulating and reflecting an incident first illumination light to emit a first optical image, a second reflection-type image-forming means for spatially modulating and reflecting an incident second illumination light to emit a second optical image, a third reflection-type image-forming means for spatially modulating and reflecting an incident third illumination light to emit a third optical image, a first wavelength separation mirror for reflecting illumination light of a predetermined wavelength in incident light and emitting it as the first illumination light to the first reflection-type image-forming means and transmitting and emitting the remaining illumination light so as to reflect the first optical image and transmit the second and third optical images and emit the first, second, and third optical images so as to follow the optical path of the incident light in reverse, a second wavelength separation mirror for reflecting illumination light of a predetermined wavelength in light transmitted through the first wavelength separation mirror and emitting it as the second illumination light to the second reflection-type image-forming means and transmitting the remaining illumination light and emitting it as the third illumination light to the third reflection-type image-forming means so as to reflect the second optical image and transmit the third optical image and emit the second and third optical images toward the first wavelength separation mirror, a projection optical system for projecting the first, second, and third optical images, a light source for emitting predetermined light to the first wavelength separation mirror as the incident light, and a light separating means for emitting the incident light emitted from the light source to the first wavelength separation mirror and emitting the first, second, and third optical images incident from the first wavelength separation mirror to the projection optical image, the inclination of the first wavelength separation mirror set so that the optical axis of the light incident on the first wavelength separation mirror and the optical axis of the first optical image becomes smaller than 90 degrees, the inclination of the second wavelength separation mirror set so that the optical axis of the light incident on the second wavelength separation mirror and passing through the first wavelength separation mirror and the optical axis of the second optical image becomes smaller than 90 degrees.

Preferably, the first reflection-type image-forming means emits the first optical image with a plane polarization rotated with respect to the incident light and a polarization filter for selectively transmitting illumination light of a plane polarization corresponding to the plane polarization of the light incident on the first reflection-type image-forming means is arranged between the light source and the light separating means.

Alternatively, preferably, the first reflection-type image-forming means emits the first optical image with a plane polarization rotated with respect to the incident light and a polarization filter for selectively transmitting incident light of a plane polarization corresponding to the plane polarization of the first optical image is arranged between the projection optical system and the light separating means.

Alternatively, preferably, the first reflection-type image-forming means emits the first optical image with a plane polarization rotated with respect to the incident light, a first polarization filter for selectively transmitting illumination light of a plane polarization corresponding to the plane polarization of the light incident on the first reflection-type image-forming means is arranged between the light source and the light separating means, and a second polarization filter for selectively transmitting incident light of a plane polarization corresponding to the plane polarization of the first optical image is arranged between the projection optical system and the light separating means.

According to a third aspect of the present invention, there is provided a projection-type display device, comprising a reflection-type image-forming means for spatially modulating and reflecting illumination light of a predetermined plane polarization to emit an optical image with a plane polarization rotated with respect to the plane polarization of the illumination light, a projection optical system for projecting the optical image, a light source for emitting the illumination light, and a light separating means for emitting the illumination light emitted from the light source toward the reflection-type image-forming means and emitting the optical image emitted from the reflection-type image-forming means to the projection optical system, a polarization separation element for selectively transmitting illumination light of a plane polarization corresponding to the plane polarization of the light incident on the reflection-type image-forming means and selectively reflecting the component of the plane polarization orthogonal to that plane polarization arranged between the light source and the light separating means.

Preferably, the polarization separation element is formed on an incident facet of the illumination light of the light separating means.

According to a fourth aspect of the present invention, there is provided a projection-type display device provided with a reflection-type image-forming means for spatially modulating and reflecting illumination light of a predetermined plane polarization to emit an optical image with a plane polarization rotated with respect to the plane polarization of the illumination light, a projection optical system for projecting the optical image, a light source for emitting the illumination light, and a light separating means for emitting the illumination light emitted from the light source toward the reflection-type image-forming means and emitting the optical image emitted from the reflection-type image-forming means to the projection optical system, a polarization separation element for selectively transmitting incident light of a predetermined plane polarization corresponding to the plane polarization of the optical image and selectively reflecting the component of the plane polarization orthogonal to that plane polarization arranged between the projection optical system and the light separating means.

Preferably, the polarization separation element is formed on an emission facet of the optical image of the light separating means.

According to a fifth aspect of the present invention, there is provided a projection-type display device provided with a reflection-type image-forming means for spatially modulating and reflecting illumination light of a predetermined plane polarization to emit an optical image with a plane polarization rotated with respect to the plane polarization of the illumination light, a projection optical system for projecting the optical image, a light source for emitting the illumination light, and a light separating means for emitting the illumination light emitted from the light source toward the reflection-type image-forming means and emitting the optical image emitted from the reflection-type image-forming means to the projection optical system, a first polarization separation element for selectively transmitting illumination light of a plane polarization corresponding to the plane polarization of the light incident on the reflection-type image-forming means and selectively reflecting the component of the plane polarization orthogonal to that plane polarization arranged between the light source and the light separating means, a second polarization separation element for selectively transmitting incident light of a predetermined plane polarization corresponding to the plane polarization of the optical image and selectively reflecting the component of the plane polarization orthogonal to that plane polarization arranged between the projection optical system and the light separating means.

Preferably, the first polarization separation element is formed on an incident facet of the illumination light of the light separating means.

Alternatively, preferably the second polarization separation element is formed on an emission facet of the optical image of the light separating means.

According to a sixth aspect of the present invention, there is provided a projection-type display device provided with a reflection-type image-forming means for spatially modulating illumination light of a predetermined plane polarization to emit an optical image with a plane polarization rotated with respect to the plane polarization of the illumination light, a projection optical system for projecting the optical image, a light source for emitting the illumination light, and a polarization beam splitter for emitting the illumination light emitted from the light source toward the reflection-type image-forming means and emitting a predetermined polarization component in the optical light incident from the reflection-type image-forming means to the projection optical system, the polarization beam splitter being formed by a member satisfying the following relationship:

$$5.00 \times 10^2 \geq K \cdot \alpha \cdot E \cdot \frac{Cp}{\rho} \int_{\lambda_2}^{\lambda_1} (1-T) d\lambda$$

where, K: photoelasticity constant of the member (nm/mm·mm²/N),
α: linear expansion coefficient of the member ($10^{-6}$/K),
E: Young's modulus of the member ($10^3$N/mm²),
λ: wavelength of the illumination light (nm),
T: internal transmittance of the member at the wavelength λ,
ρ: specific gravity of the member (g/cm³), and
Cp: specific heat of the member (J/g·k),
the integration range in Equation being a range of the light absorption wavelength band of the member.

According to a seventh aspect of the present invention, there is provided a projection-type display device provided with a plurality of reflection-type image-forming means each of which for spatially modulating incident light of a predetermined wavelength and emitting an optical image with a plane polarization rotated with respect to the plane polarization of the incident light, a light source for emitting illumination light, a dichroic prism for emitting illumination light emitted from the light source to the plurality of reflection-type image-forming means based on wavelength and emitting the optical images incident from the plurality of reflection-type image-forming means so as to run in reverse along the optical axis of the illumination light, a projection optical system for projecting the optical images, and a polarization beam splitter for emitting the illumination light emitted from the light source toward the dichroic prism and emitting a predetermined polarization component in the optical images incident from the dichroic prism to the projection optical system, the polarization beam splitter and/or the dichroic prism being formed by a member satisfying the following relationship:

$$5.00 \times 10^2 \geq K \cdot \alpha \cdot E \cdot \frac{Cp}{\rho} \int_{\lambda_2}^{\lambda_1} (1-T) d\lambda$$

where, K: photoelasticity constant of the member (nm/mm·mm²/N),
α: linear expansion coefficient of the member ($10^{-6}$/K),
E: Young's modulus of the member ($10^3$N/mm²),
λ: wavelength of the illumination light (nm),
T: internal transmittance of the member at the wavelength λ,
ρ: specific gravity of the member (g/cm³), and
Cp: specific heat of the member (J/g·k),
the integration range in Equation being a range of the light absorption wavelength band of the member.

Preferably, the light absorption wavelength band is a range of 420 nm to 500 nm.

Alternatively, preferably, a polarization separation element for selectively transmitting illumination light of a plane polarization corresponding to the plane polarization of the light incident on the reflection-type image-forming means and selectively reflecting the component of the plane polarization orthogonal to that plane polarization is arranged between the light source and the polarization beam splitter.

Preferably, the polarization separation element is formed on an incident facet of the illumination light of the polarization beam splitter.

Alternatively, preferably, a polarization separation element for selectively transmitting incident light of a predetermined plane polarization corresponding to the plane polarization of the optical image and selectively reflecting the component of the plane polarization orthogonal to that plane polarization is arranged between the projection optical system and the polarization beam splitter.

Preferably, the polarization separation element is formed on an emission facet of the optical image of the polarization beam splitter.

According to the present invention, if the inclination of the wavelength separation mirror is set so that the angle exhibited by the optical axis of the incident light on the wavelength separation mirror and the optical axis of the first optical image becomes smaller than 90 degrees, it is possible to reduce the difference of the wavelengths in the p-polarization component and the s-polarization component reflected at the wavelength separation mirror. Accordingly, a high quality image can be displayed by improving the efficiency of utilization of the illumination light by that amount.

Further, if the inclination of the first wavelength separation mirror is set so that the angle exhibited by the optical axis of the incident light on the first wavelength separation mirror and the optical axis of the first optical image becomes smaller than 90 degrees and, further, if the inclination of the second wavelength separation mirror is set so that the angle exhibited by the optical axis of the light incident on the second wavelength separation mirror and transmitted through the first wavelength separation mirror and the optical axis of the second optical image becomes smaller than 90 degrees, the difference of wavelengths in the p-polarization component and the s-polarization component of the reflected light can be reduced in wavelength separation mirrors having a so-called three-plate type structure and, accordingly, a high quality image can be displayed by improving the efficiency of utilization of the illumination light by that amount.

If a polarization separation element is arranged between the light source and the light separating means, the component never modulated by the reflection-type image forming means is blocked and this component can be returned to the light source side. By this, a lowering of the contrast due to the projection of this component is prevented, and thus the high quality image can be displayed. Further, the efficiency of utilization of the illumination light can be improved by utilizing this component again, and a temperature rise can be prevented by that amount.

Further, if a polarization separation element is arranged between the projection optical system and the light separating means, the component lowering the contrast in the projected image is blocked and this component can be returned to the light source side. By this, the lowering of the contrast due to the projection of this component is prevented and a high quality image can be displayed. Further, the efficiency of utilization of the illumination light can be improved by utilizing this component again, and a temperature rise can be prevented by that amount.

Further, according to the present invention, even if the birefringence is increased in a member satisfying the relationships due to an increase of stress by the rise of the temperature, the degree of the birefringence can be made to stay in a range enough for the practical use. By this, the above haze phenomenon due to the birefringence can be reduced and it becomes possible to improve the contrast by that amount and display a high quality display image.

BRIEF DESCRIPTION OF THE DRAWINGS

These and other features of the present invention will become clearer from the following description of the preferred embodiments given with reference to the accompanying drawings, in which.

DESCRIPTION OF THE PREFERRED EMBODIMENTS

Figure 1:
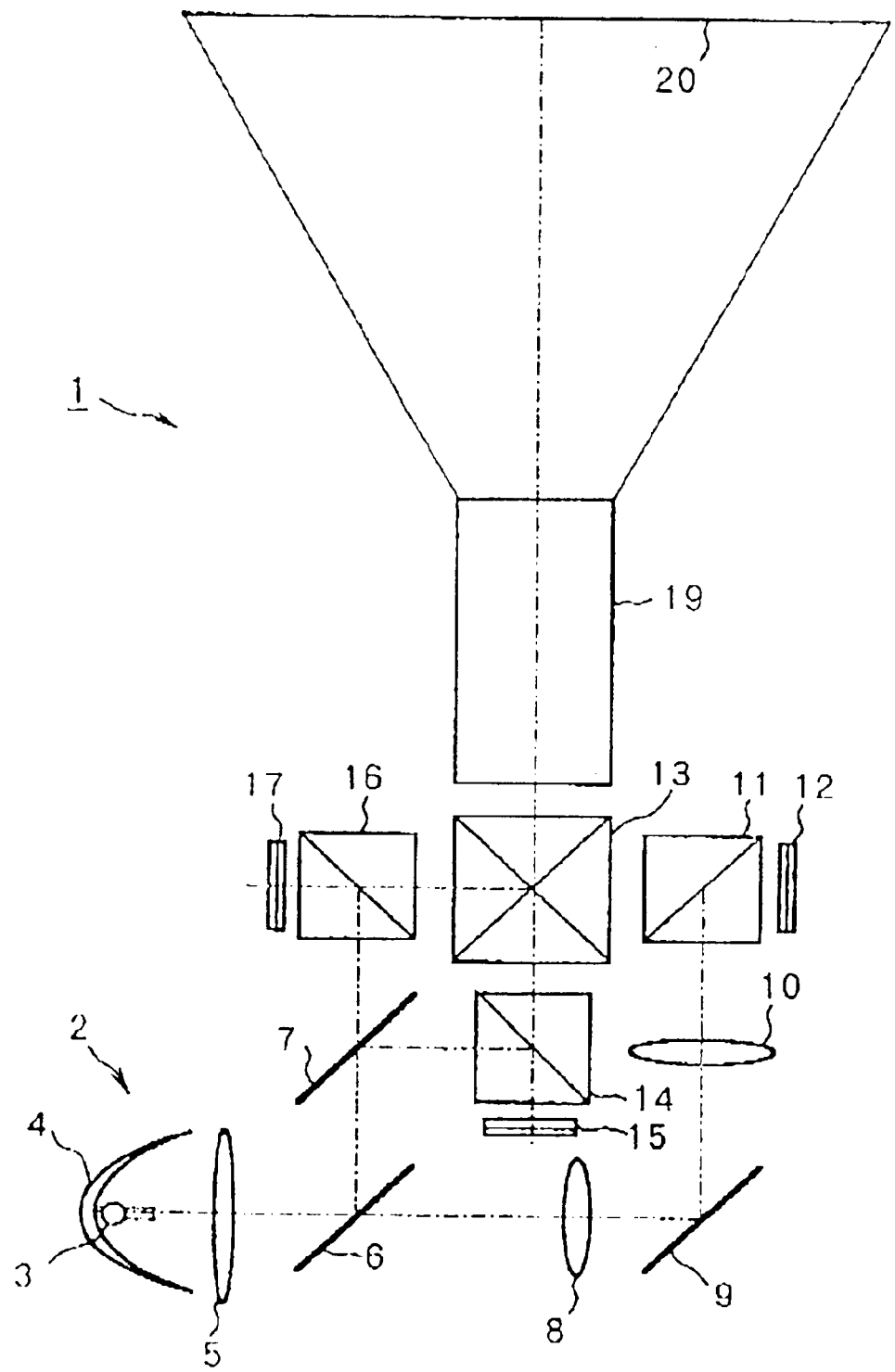
FIG. 1 is a view of the configuration of a projection-type display device of the related art.

Below, embodiments of the present invention will be explained in detail by appropriately referring to the drawings.

FIRST EMBODIMENT

Figure 2:
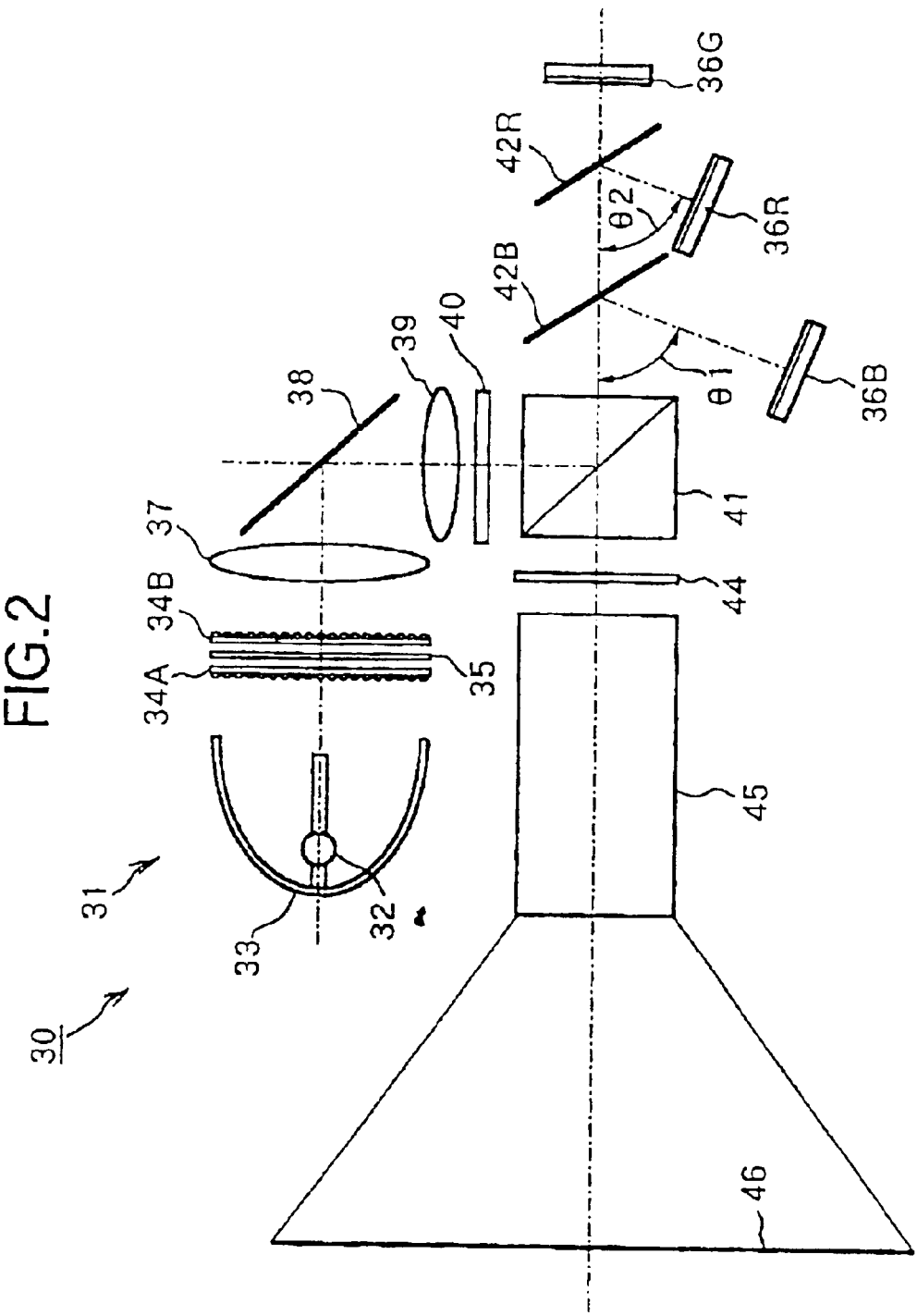
FIG. 2 is a view of the configuration of a first embodiment of a projection-type display device according to the present invention.

FIG. 2 is a view of the configuration of a first embodiment of a projection-type display device according to the present invention.

In a projection-type display device 30 of FIG. 2, a light source 31 is comprised of a xenon lamp 32 arranged in the vicinity of a reflector 33 formed by a substantially parabolic mirror and emits the white illumination light emitted from the xenon lamp 32 from an opening of the reflector 33.

Further, the light source 31 is provided with a pair of fly eye lenses 34A and 34B arranged on the optical path of this illumination light. Due to this, the distribution of the amount of the illumination light is made uniform.

Further, the light source 31 is provided with a plane polarization conversion sheet 35 arranged between these fly eye lenses 34A and 34B.

Here, the plane polarization conversion sheet 35 is an optical element which mainly selectively transmits the s-polarization component, that is, the polarized light which can be effectively spatially modulated at the reflection-type liquid crystal panels 36A, 36B, and 36C, in this projection-type display device 30 therethrough and converts p-polarization component orthogonal to this to s-polarization component.

By this, the light source 31 increases the polarization component effective for the image display in the illumination light emitted with various plane polarizations from the xenon lamp 32, and reduces the polarization component orthogonal to this and emits the resultant illumination light. As a result, the efficiency of utilization of the illumination light is improved and the contrast of the display image is improved.

The convex lens 37 converges and emits the illumination light on the optical path of the illumination light emitted from the fly eye lens 34B.

The mirror 38 is struck by the illumination light emitted from this convex lens 37 and reflects and emits this in a 90 degree direction with respect to the path of the incident light.

A convex lens 39 converges and emits the illumination light reflected at this mirror 38.

A polarization filter 40 selectively transmits the s-polarization component effective for the image display in the illumination light emitted from the convex lens 39 therethrough and absorbs the p-polarization component orthogonal to this. By this, the polarization filter 40 selectively emits only the s-polarization component effective for the image display from the light source side toward a polarization beam splitter 41.

The polarization beam splitter 41 selectively reflects an s-polarization component necessary for the image display, and selectively transmits a p-polarization component orthogonal to this therethrough. By this, the polarization beam splitter 41 reflects most of the illumination light incident from the polarization filter 40 and bends the optical path by 90 degrees, but, in contrast, selectively transmits the p-polarization components of the optical images resulting from the p-polarization and the s-polarization from the reflection-type liquid crystal panels 36A, 36B, and 36G running in reverse along this optical path.

The dichroic mirror 42B functions as a wavelength separation mirror which is formed by laminating transparent dielectric films on sheet glass, selectively reflects components having a predetermined wavelength in the incident light, and selectively transmits the remaining components therethrough. The dichroic mirror 42B selectively reflects the illumination light component of the blue band in the illumination light emitted from the polarization beam splitter 41, emits this toward the reflection-type liquid crystal panel 36B, and transmits the remaining components therethrough.

The reflection-type liquid crystal panel 36B is driven by a blue color signal and forms the blue image in the image to be displayed by this projection-type display device 30. The reflection-type liquid crystal panel 36B transmits the illumination light incident from the dichroic mirror 42B therethrough, reflects it at a reflection plate arranged at its back surface, and transmits it therethrough again and emits this and thereby emits modulated light with a plane polarization rotated according to the blue image. By this, the reflection-type liquid crystal panel 36B emits the optical image of the synthesized light of the p-polarized light and the s-polarized light to the dichroic mirror 42B for the illumination light incident due to the s-polarization.

The dichroic mirror 42B selectively reflects the modulated light incident from the reflection-type liquid crystal panel 36B in this way and emit it to the polarization beam splitter 41 and transmits the modulated light incident from a further continuing dichroic mirror 42R therethrough to emit it to the polarization beam splitter 41.

The dichroic mirror 42B is arranged inclined by an angle of 45 degrees with respect to the optical axis of the incident light so that an angle θ1 exhibited by the optical axis of the incident light and the optical axis of the optical image obtained from the reflection-type liquid crystal panel 36B becomes smaller than 90 degrees.

The dichroic mirror 42B was arranged in this way for the following reason.

Figure 3:
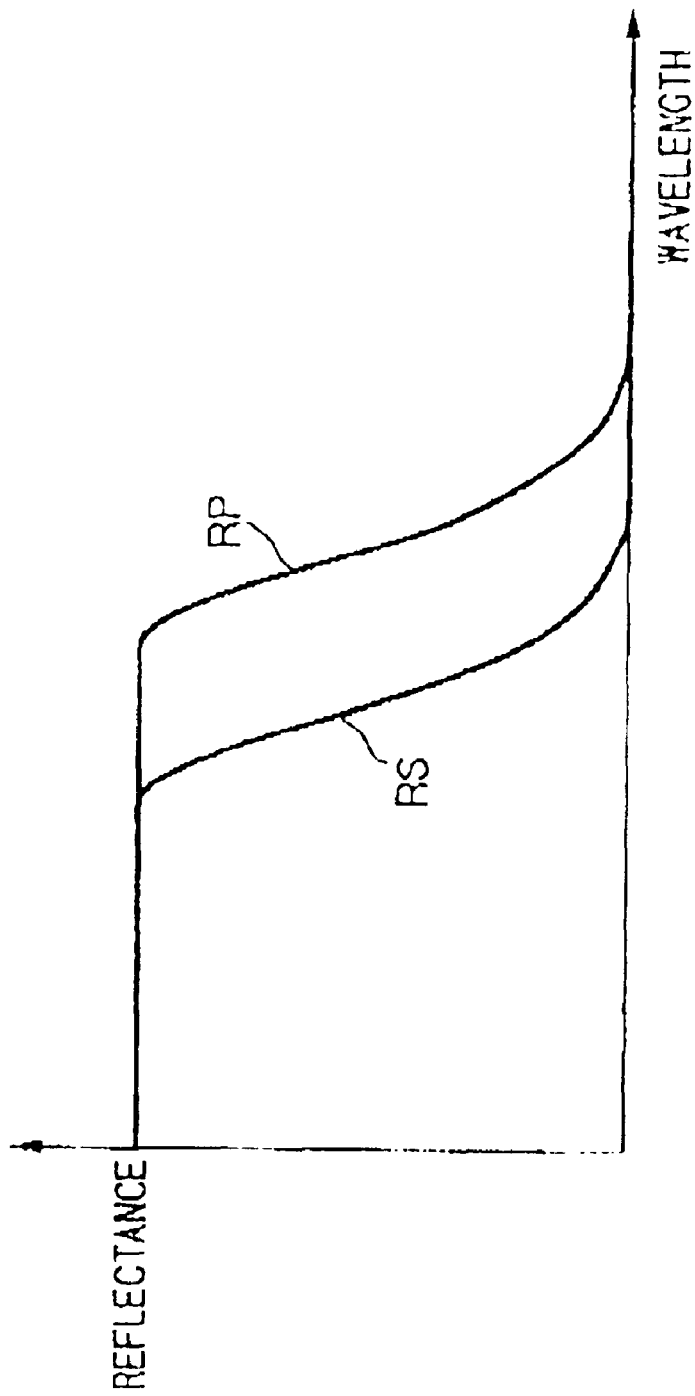
FIG. 3 is a graph of the characteristics of a dichroic mirror.

Namely, in the dichroic mirror 42B for selectively reflecting only the incident light having the intended wavelength, the cutoff wavelength for the selective transmission and reflection is different between the p-polarization component and the s-polarization component which strike at an angle as shown by the reflectance of the p-polarization component and the reflectance of the s-polarization component shown by the symbols RP and RS in FIG. 3. Contrary to this, this type of projection-type display device 30 reflects the incident light of the s-polarization component for the reflection-type liquid crystal panel 36B, reflects the optical image of the p-polarization component incident from this reflection-type liquid crystal panel 36B, and emits it to the polarization beam splitter 41. Due to this, when the cutoff wavelength for selective transmission is different between the p-polarization component and the s-polarization component in this way, the efficiency of utilization of the light will be lowered by that amount.

However, there is the characteristic feature that if the incident angle of the incident light becomes smaller, the difference of the cutoff wavelength in reflected lights of the p-polarization component and the s-polarization component is lowered by that amount.

Therefore, the projection-type display device 30 is provided with the dichroic mirror 42B arranged inclined at an angle of 45 degrees with respect to the optical axis of the incident light so that the angle θ1 exhibited by the optical axis of the incident light and the optical axis of the optical image obtained from the reflection-type liquid crystal panel 36B becomes smaller than 90 degrees.

Further, the reflection-type liquid crystal panel 36B is arranged close to the polarization beam splitter 41 side so that the shape of the entire projection-type display device 30 can be reduced.

The dichroic mirror 42R functions as a wavelength separation mirror which is formed by laminating transparent dielectric films on sheet glass, selectively reflects the components of predetermined wavelengths in the incident light, and selectively transmits the remaining components therethrough. The dichroic mirror 42R selectively reflects the illumination light component of the red band in the illumination light transmitted through the dichroic mirror 42B and emits this toward the reflection-type liquid crystal panel 36R, while transmits the remaining components and emits them toward the reflection-type liquid crystal panel 36G.

The reflection-type liquid crystal panel 36R is driven by a red color signal and forms the red image in the image to be displayed by this projection-type display device 30. The reflection-type liquid crystal panel 36R transmits the illumination light incident from the dichroic mirror 42R therethrough, then reflects it by the reflection plate arranged on its back surface, transmits it again, and emits this and thereby emits modulated light with a plane polarization rotated according to the red image. By this, the reflection-type liquid crystal panel 36R emits the optical image of the synthesized light of the p-polarized light and the s-polarized light to the dichroic mirror 42R for the illumination light incident due to the s-polarization.

The reflection-type liquid crystal panel 36G is driven by a green color signal and forms the green image in the image to be displayed by this projection-type display device 30. The reflection-type liquid crystal panel 36G transmits the illumination light incident from the dichroic mirror 42R therethrough, then reflects it by the reflection plate arranged on its back surface, transmits it again, and emits this, thereby to emit modulated light with a plane polarization rotated according to the green image. By this, the reflection-type liquid crystal panel 36G emits the optical image of the synthesized light of the p-polarized light and the s-polarized light to the dichroic mirror 42R for the illumination light incident due to the s-polarization.

The dichroic mirror 42R selectively reflects the modulated light incident from the reflection-type liquid crystal panel 36R in this way and emits this to the dichroic mirror 42B, while transmits the modulated light incident from the reflection-type liquid crystal panel 36G therethrough and emits this to the dichroic mirror 42B.

In the dichroic mirror 42R synthesizing the green and red modulated lights and emitting the result in this way as well, if the wavelength becomes different between the reflection lights of the p-polarization component and the s-polarization component and the incident angle of the incident light becomes small, the difference of wavelengths becomes smaller by that amount. For this reason, the dichroic mirror 42R is arranged in parallel to the dichroic mirror 42B and arranged inclined at an angle of 45 degrees with respect to the optical axis of the incident light so that the angle θ2 exhibited by the optical axis of the incident light and the optical axis of the optical image obtained from the reflection-type liquid crystal panel 36R becomes smaller than 90 degrees.

Further, the reflection-type liquid crystal panel 36R is arranged close to the polarization beam splitter 41 side so that the shape of the projection-type display device 30 can be made smaller as a whole.

The polarization beam splitter 41 mainly supplies the illumination light due to the s-polarization emitted from the light source 31 to these dichroic mirrors 42B, 42R, etc., and transmits the p-polarization component in the optical image of the synthesized light of the p-polarized light and the s-polarized light generated by the reflection-type liquid crystal panels 36B, 36R, and 36G as a result of this therethrough and emits this toward the screen.

The polarization filter 44 selectively transmits the p-polarization component therethrough on the optical path of the modulated light emitted from this polarization beam splitter 41, and selectively absorbs the s-polarization component. The projection optical system 45 enlarges and projects the transmitted light of this polarization filter 44 on the screen 46.

Next, an explanation will be made of the operation due to this configuration.

In the projection-type display device 30, the reflection-type liquid crystal panels 36B, 36R, and 36G are driven by the blue, red, and green color signals so that images corresponding to the blue, red, and green color signals are formed on the reflection-type liquid crystal panels 36B, 36R, and 36G. In the projection-type display device 30, the illumination light emitted from the light source 31 is broken down into the blue, red, and green wavelengths which are then supplied to the reflection-type liquid crystal panels 36B, 36R, and 36G. Due to this, the plane polarizations of the blue, red, and green illumination light are rotated by the images corresponding to these blue, red, and green color signals to generate optical images. The p-polarization components of these optical images are selectively projected onto the screen 36 by the projection optical system 45 so as to project a color display image.

Namely, the illumination light emitted from the light source 31 is made to strike the polarization beam splitter 41 via the mirror 38. There, the s-polarization component effective for the formation of the optical image is reflected at the reflection-type liquid crystal panels 36B, 36R, and 36G and broken down into blue, red, and green illumination lights by continuing dichroic mirrors 42B and 42R. The blue, red, and green illumination lights are polarized and reflected at the reflection-type liquid crystal panels 36B, 36R, and 36G to generate blue, red, and green optical images by the synthesized light of the p-polarized light and the s-polarized light. These optical images strike upon the polarization beam splitter 41 via the dichroic mirrors 42B and 42R. The p-polarization components of these modulated light are selectively transmitted through the polarization beam splitter 41, strike the projection optical system 45, and are projected on the screen 46 by this projection optical system 45.

At this time, the illumination light obliquely strikes the dichroic mirrors 42B and 42R at an angle due to the s-polarization, while the modulated light obliquely strikes the dichroic mirrors 42B and 42R as synthesized light of the p-polarized light and the s-polarized light. Contrary to this, since the dichroic mirrors 42B and 42R have different characteristics of reflection with respect to wavelength between the p-polarized light and the s-polarized light, the characteristics of reflection with respect to the wavelength in the illumination light and the characteristic of reflection in the modulated light are made different (FIG. 3).

In this embodiment, however, the dichroic mirrors 42B and 42R are arranged inclined so that the angle exhibited by the optical axis of the illumination light with respect to the dichroic mirrors 42B and 42R and the optical axis of the modulated light incident upon the dichroic mirrors 42B and 42R becomes smaller than 90 degrees, therefore the difference of the cutoff wavelengths in the reflected light of the p-polarized light and the reflected light of the s-polarized light can be made smaller. Namely, compared with the blue, red, and green illumination light emitted from the dichroic mirrors 42B and 42R toward the reflection-type liquid crystal panels 36B, 36R, and 36G, it becomes possible to emit the modulated lights of the blue, red, and green p-polarized light corresponding to the illumination light toward the projection optical system 45 with no waste and therefore possible to improve the efficiency of utilization of the illumination light by that amount and form a bright high quality display image.

As explained above, the projection-type display device 30 spatially modulates the illumination light of the s-polarized light at the reflection-type liquid crystal panels 36B, 36R, and 36G and emits the modulated light of the p-polarized light and the s-polarized light to the polarization beam splitter 41 via the dichroic mirrors 42B and 42R.

The polarization beam splitter 41 transmits the p-polarization component in the optical image of the p-polarized light and the s-polarized light and emits it toward the screen. At this time, the component of the optical image resulting from the s-polarized light should be separated from the optical image resulting from the p-polarized light at the polarization beam splitter 41 and not be projected on the screen 46, but part passes through the polarization beam splitter 41.

If the component of the optical image resulting from the s-polarized light is projected on the screen 46, the contrast of the display image will be lowered, but in this embodiment, the polarization filter 44 is arranged between the polarization beam splitter 41 and the projection optical system 45. Therefore, the s-polarization component transmitting through the polarization beam splitter 41 is absorbed by this polarization filter 44. Due to this, compared with the related art, the amount of light will be greatly reduced for the s-polarization component lowering the contrast in this way. Accordingly, the contrast of the display image on the screen 46 is increased by that amount, and it becomes possible to display a high quality display image.

Further, for the illumination light supplied to the reflection-type liquid crystal panels 36B, 36R, and 36G, while the s-polarization component in the illumination light supplied from the light source 31 is reflected at the polarization beam splitter 41 and supplied, part of the p-polarization component is reflected and supplied.

If this p-polarization component is reflected without any modulation at the reflection-type liquid crystal panels 36B, 36R, and 36G and projected on the screen 46 without any differentiation from the optical image (p-polarization component), this component will also lower the contrast of the display image, but in this embodiment, since the polarization filter 40 is arranged between the light source 31 and the polarization beam splitter 41, the p-polarization component is absorbed by this polarization filter 40. Due to this, the amount of light of the illumination light due to the p-polarization supplied to the reflection-type liquid crystal panels 36B, 36R, and 36G is greatly reduced. Accordingly, the contrast of the display image is increased by that amount and it becomes possible to display a high quality display image.

Further, a uniform amount of the illumination light can be supplied by the fly eye lenses 34A and 34B arranged at the light source 31, uneven luminance of the display image is prevented by that amount, and it becomes possible to display a high quality display image also by this.

Further, by the plane polarization conversion sheet 35 arranged between these fly eye lenses 34A and 34B, the p-polarization component which is absorbed by the polarization filter 40 or passes through the polarization beam splitter 41 and is never effective for the display of the image is partially converted to the s-polarization component and emitted, whereby the efficiency of utilization of the illumination light is increased by that amount, the luminance level of the display image is improved, and thereby also it becomes possible to display a high quality display image. Further, by the lowering of the amount of light of the p-polarization component incident upon the polarization filter 40 in this way by that amount, the temperature rise at the polarization filter 40 can be reduced and deterioration of the characteristics due to the temperature rise can be prevented.

As explained above, according to the first embodiment, the dichroic mirror was arranged inclined so that the angle exhibited by the optical axis of the illumination light incident on the dichroic mirror serving as the wavelength separation mirror and the optical axis of the modulated light becomes smaller than 90 degrees, therefore, in the configuration for generating modulated light of the p-polarized light and the s-polarized light from the illumination light of the s-polarized light and projecting the same onto the screen, the difference of wavelengths in the p-polarization component and the s-polarization component of the reflected light can be reduced, the efficiency of utilization of the illumination light can be improved by that amount, and as a result a high quality image can be displayed.

Further, by arranging the polarization filters between the light source and the polarization beam splitter and between the polarization beam splitter and the projection optical system and making them absorb the p-polarization component and the s-polarization component, it is possible to prevent the above haze phenomenon of the display image and be able to increase the contrast and therefore able to display a higher quality image by that amount.

SECOND EMBODIMENT

Figure 4:
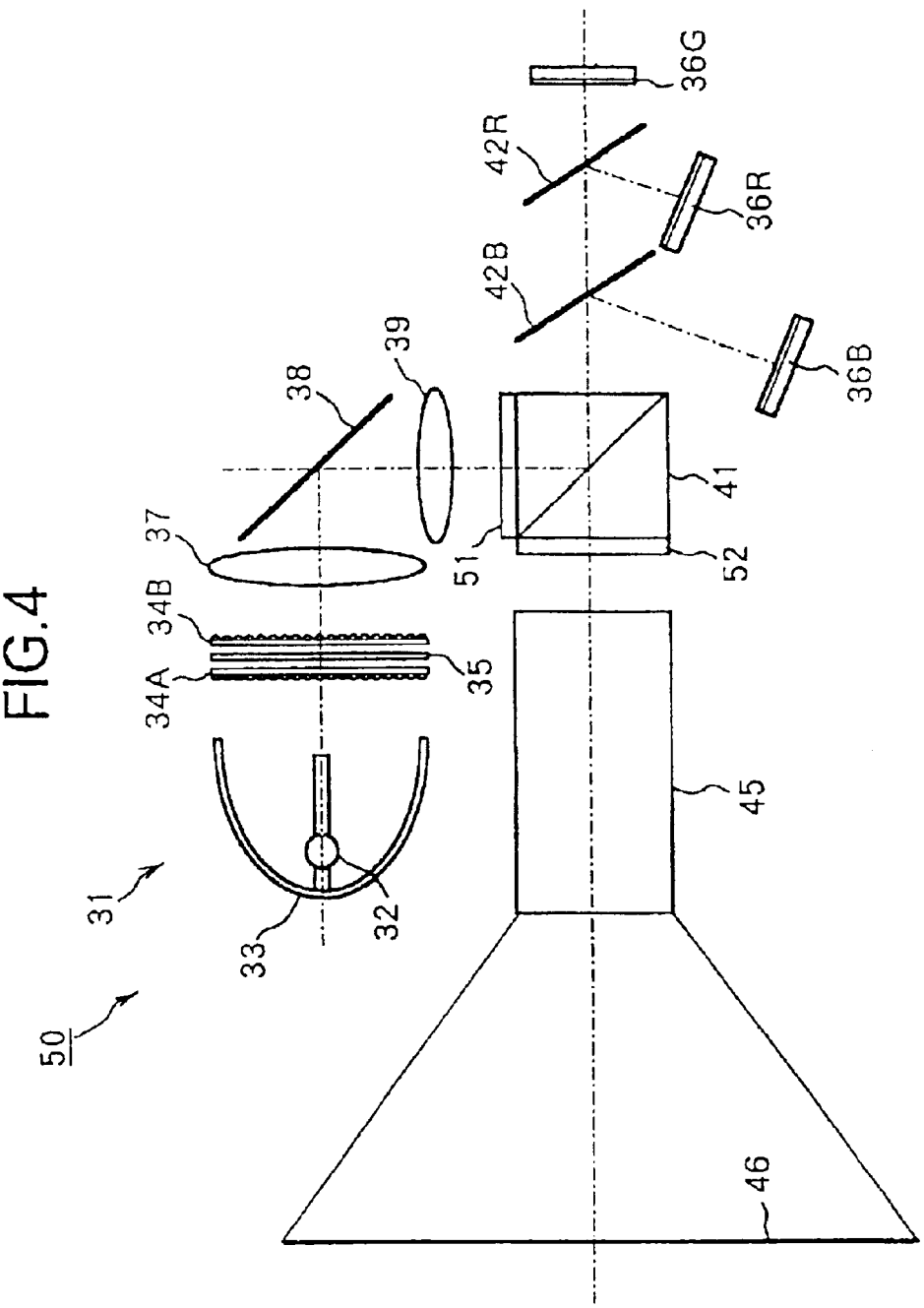
FIG. 4 is a view of the configuration of a second embodiment of a projection-type display device according to the present invention.

FIG. 4 is a view of the configuration of a second embodiment of a projection-type display device according to the present invention.

The difference of a projection-type display device 50 according to the second embodiment from the projection-type display device 30 according to the first embodiment explained above resides in that polarization separation elements 51 and 52 are arranged in place of the polarization filters as shown in FIG. 4.

Note that since this projection-type display device 50 is configured in the same way as the projection-type display device 30 mentioned above except that the polarization separation elements 51 and 52 are arranged in place of the polarization filters, the corresponding configurations are indicated by same references and overlapping explanations will be omitted.

Figure 5:
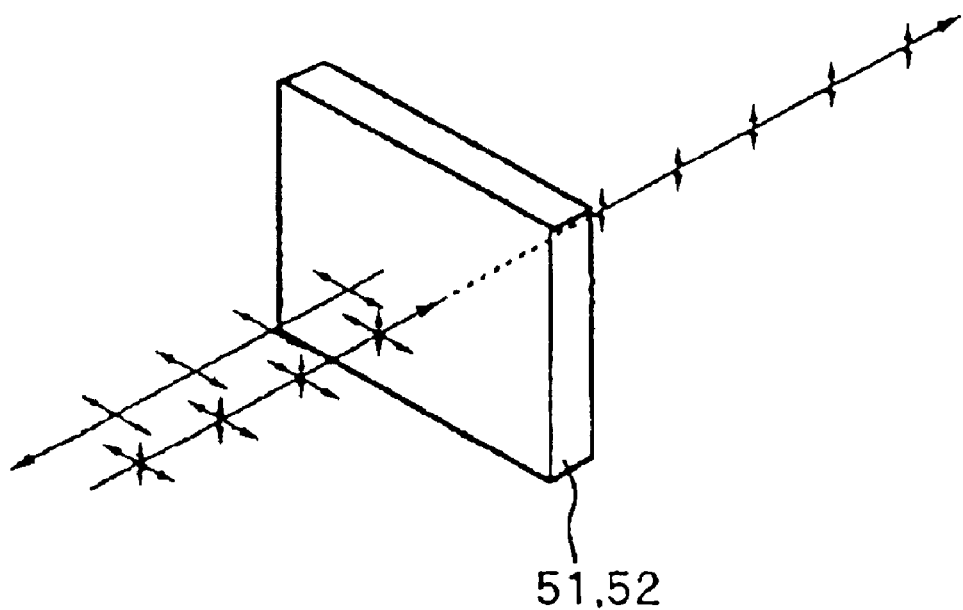
FIG. 5 is a view for explaining a function of a polarization separation element of FIG. 4.

The polarization separation elements 51 and 52 are formed by laminating films having predetermined thicknesses having optical anisotropy and, as shown in FIG. 5, selectively transmit the incident light having the predetermined plane polarizations therethrough, while selectively reflect the incident light having the plane polarizations orthogonal to them.

The polarization separation element 51 is arranged between a convex lens 39 and the polarization beam splitter 41 and selectively transmits the s-polarization component in the illumination light incident from the light source 31 therethrough, while selectively reflects the p-polarization component.

The polarization separation element 52 is arranged between the projection optical system 45 and the polarization beam splitter 41 and selectively transmits the p-polarization component in the incident light from the polarization beam splitter 41 therethrough, while selectively reflects the s-polarization component.

By this, the polarization separation elements 51 and 52 improve the contrast of the display image.

Further, at this time, unlike polarization filters, they do not absorb the p-polarization component and s-polarization component, but reflect them, so the temperature rise can be reduced by that amount.

Note that the light returned to the light source 31 side or the polarization beam splitter 41 in this way changes in its plane polarization due to multiple reflection etc. at the light source 31 etc. and will reach the polarization separation elements 51 and 52 as components which will pass through the polarization separation elements 51 and 52. Due to this, this projection-type display device 50 can improve the luminance level of the display image by utilizing the illumination light efficiently.

Further, the polarization separation elements 51 and 52 are held and adhered to the incident facet and the emission facet of the polarization beam splitter 41 by an optical bonding material.

Due to this, the projection-type display device 50 eliminates the air layer between the polarization separation element 51 and the polarization beam splitter 41 and the air layer between the polarization separation element 52 and the polarization beam splitter 41 and therefore prevents the loss of light due to these air layers. Further, the projection-type display device 50, compared with the case of use of polarization filters absorbing the predetermined polarization component, radiates the heat generated at the polarization separation elements 51 and 52 with a good efficiency to reduce the temperature rise.

Note that, in a configuration using polarization filters as well, it can be considered to adhere the elements to the polarization beam splitter, but the temperature rise in polarization filters is larger than that of the polarization separation elements, therefore there is the apprehension that birefringence will occur at the polarization beam splitter due to the temperature rise of the polarization beam splitter per se, the contrast will be lowered, and further the uniformity will be deteriorated.

According to the second embodiment, since the polarization separation element 51 which selectively transmits the s-polarization component therethrough, and selectively reflects the p-polarization component is arranged between the light source 31 and the polarization beam splitter 41, the contrast of the display image is improved and a high quality display image can be formed.

Further, since the polarization separation element 52 which selectively transmits the p-polarization component therethrough, and selectively reflects the s-polarization component is arranged between the projection optical system 45 and the polarization beam splitter 41, the contrast of the display image is improved and a high quality display image can be formed.

Further, since these polarization separation elements 51 and 52 are held adhered to the polarization beam splitter 41, the loss of the light due to the air layer is prevented and thus a bright high quality display image can be displayed. Further, since the temperature rise can be reduced, the reliability can be improved by that amount, an aging can be prevented, and further the work required for the arrangement can be simplified.

THIRD EMBODIMENT

Figure 6:
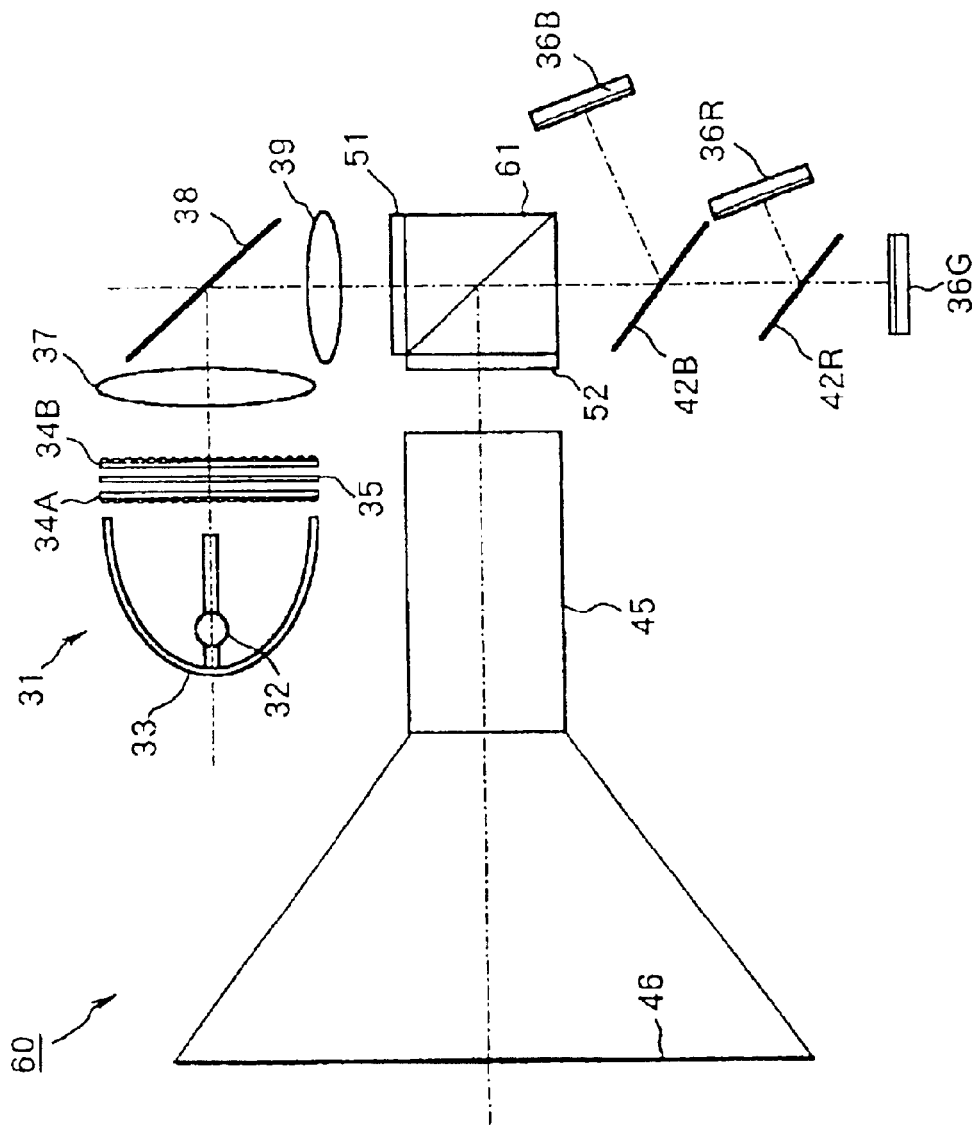
FIG. 6 is a view of the configuration of a third embodiment of a projection-type display device according to the present invention.

FIG. 6 is a view of the configuration of a third embodiment of a projection-type display device according to the present invention.

In a projection-type display device 60 according to the third embodiment, a polarization beam splitter 61 having a different transmitting and reflecting plane polarization from that of the polarization beam splitter 41 of the projection-type display device 50 of the second embodiment mentioned above is arranged. The arrangement of the optical system is changed corresponding to this.

Note that, in this projection-type display device 60, the same configurations as those of the projection-type display device 50 mentioned above are indicated by corresponding references and overlapping explanations will be omitted.

Namely, in this projection-type display device 60, the polarization beam splitter 61 transmits the s-polarization component therethrough and reflects the p-polarization component. Corresponding to this, the dichroic mirror 42R etc. are arranged on the optical path of the illumination light transmitted through the polarization beam splitter 61.

As shown in FIG. 6, even in the case where a polarization beam splitter of a different configuration is used, similar effects to those by the second embodiment can be obtained.

FOURTH EMBODIMENT

Figure 7:
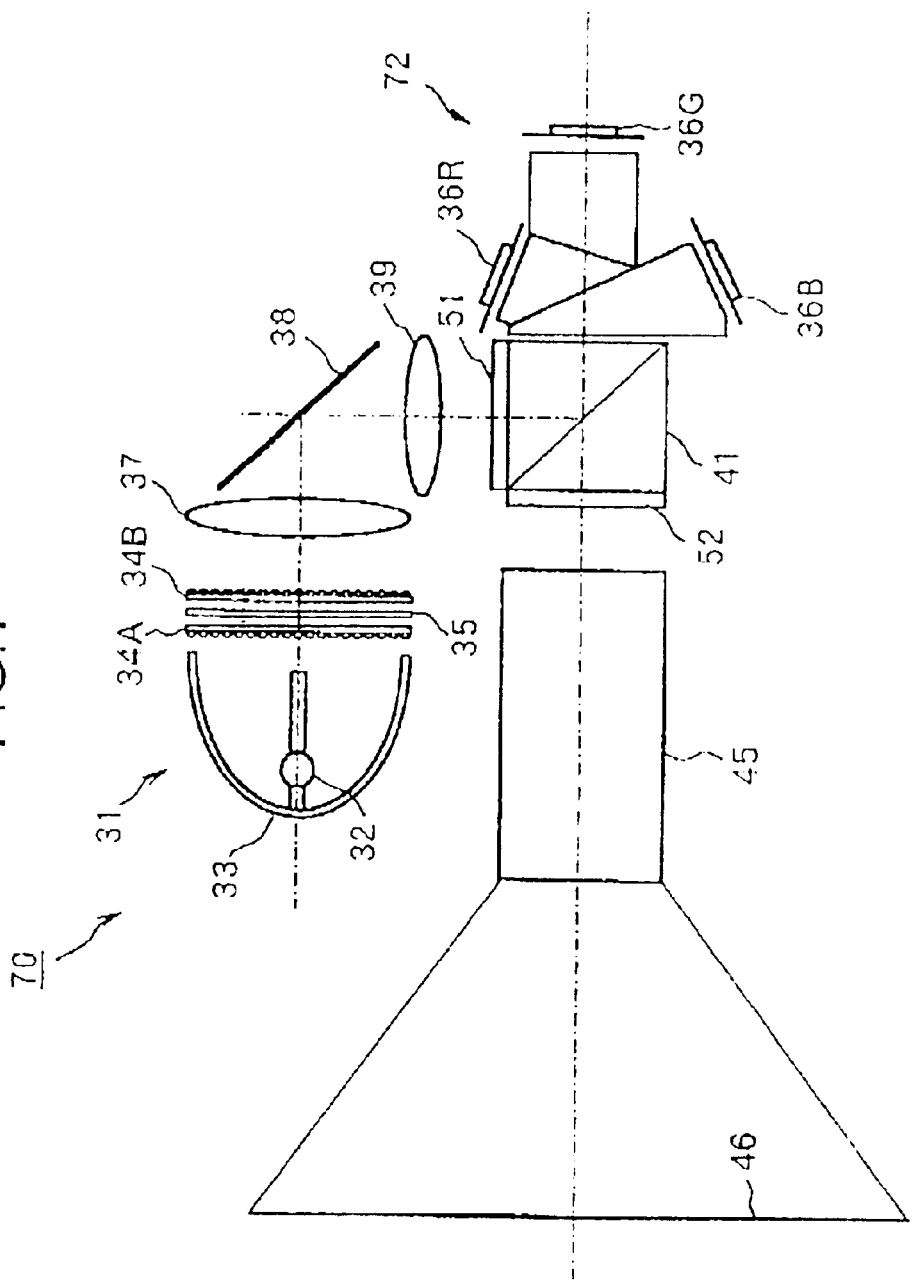
FIG. 7 is a view of the configuration of a fourth embodiment of a projection-type display device according to the present invention.

FIG. 7 is a view of the configuration of a fourth embodiment of a projection-type display device according to the present invention.

In this projection-type display device 70, the illumination light is broken down into red, blue, and green illumination lights by a dichroic prism 72 in place of the dichroic mirrors 42R, 42B in the projection-type display device 30 and the red, blue, and green optical images are synthesized.

As in FIG. 7, even if the illumination light is broken down into red, blue, and green illumination light by a dichroic prism 72 in place of the dichroic mirrors 42R, 42B and red, blue, and green optical images are combined, similar effects as those by the above embodiment can be obtained.

Note that, in the first to fourth embodiments, the description was made of the cases where polarization filters or polarization separation elements are arranged on the light source side and projection optical system side of the polarization beam splitter, but the present invention is not limited to these. It is also possible if they are arranged on either side in the case where characteristics enough for practical use can be obtained.

Further, in the third and fourth embodiments, the description was made of cases where the polarization separation elements were held adhered to the polarization beam splitter, but the present invention is not limited to these. It is also possible if they are arranged with an air layer interposed therebetween in the case where characteristics enough for practical use can be obtained.

Further, in the third and fourth embodiments, the description was made of cases where the polarization separation elements were constituted by laminating films having predetermined thicknesses having optical anisotropy, but the present invention is not limited to these. It is also possible if this type of polarization separation element is constituted by laminating transparent members having optical anisotropy to a predetermined thickness on for example a glass plate.

Further, in the third and fourth embodiments, the description was made of cases where the polarization separation elements were simply arranged, but the present invention is not limited to this. It is also possible if the polarization separation elements are arranged by AR coating.

FIFTH EMBODIMENT

Figure 8:
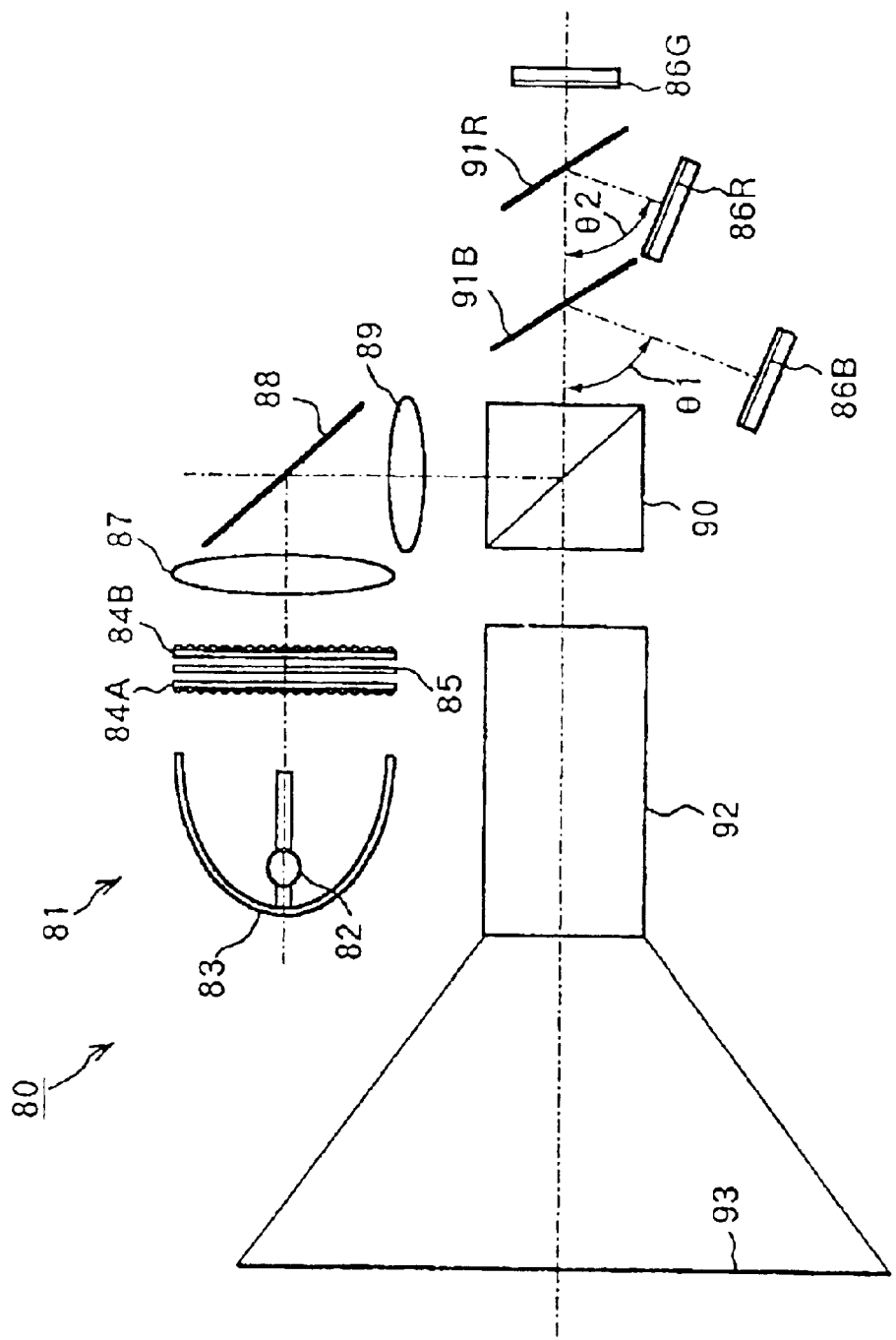
FIG. 8 is a view of the configuration of a fifth embodiment of a projection-type display device according to the present invention.

FIG. 8 is a view of the configuration of a fifth embodiment of a projection-type display device according to the present invention.

The difference of a projection-type display device 80 of the fifth embodiment from the projection-type display devices 30, 50, 60, and 70 of the first to fourth embodiments resides in that, in place of the arrangement of the polarization filters or polarization separation elements on the light source side and projection optical system side of the polarization beam splitter, as will be mentioned later, a polarization beam splitter placing predetermined conditions on the structural parameters is constituted, whereby the lowering of the contrast due to the above haze phenomenon is stopped to an extent sufficient for practical use and a high quality image can be displayed.

Below, an explanation will be made of the concrete configuration and operation of the projection-type display device 80 according to the fifth embodiment in sequence in relation to FIG. 8 and FIG. 9.

In the projection-type display device 80 of FIG. 8, a light source 81 is comprised of an xenon lamp 82 arranged in the vicinity of a reflector 83 formed by a substantially parabolic mirror and emits white illumination light from the xenon lamp 82 from an opening of the reflector 83.

Further, the light source 81 is provided with a pair of fly eye lenses 84A and 84B arranged on the optical path of this illumination light so as to make the distribution of the amount of the illumination light uniform.

Further, the light source 81 is provided with a plane polarization conversion sheet 85 arranged between these fly eye lenses 84A and 84B.

Here, the plane polarization conversion sheet 85 is an optical element which mainly selectively transmits the s-polarization component, that is, the polarized light which can be effectively spatially modulated at the reflection-type liquid crystal panels 86A, 86B, and 86C, in this projection-type display device 80 therethrough, and converts p-polarization component orthogonal to this to s-polarization component.

By this, the light source 81 increases the polarization component effective for the image display in the illumination light emitted with various plane polarizations from the xenon lamp 82, and reduces the polarization component orthogonal to this and emits the resultant illumination light. As a result, the efficiency of utilization of the illumination light is improved and the contrast of the display image is improved.

The convex lens 87 converges and emits the illumination light on the optical path of the illumination light emitted from the fly eye lens 84B.

The mirror 88 is struck by the illumination light emitted from this convex lens 87 and reflects and emits this in a 90 degree direction with respect to the path of the incident light.

A convex lens 89 converges and emits the illumination light reflected at this mirror 88.

A polarization beam splitter 90 selectively reflects the s-polarization component effective for the image display, and selectively transmits the p-polarization component orthogonal to this therethrough. By this, the polarization beam splitter 90 reflects most of the illumination light incident from the convex lens 89 and bends the optical path by 90 degrees, but in contrast selectively transmits the p-polarization component of the optical image of the p-polarization and the s-polarization from the reflection-type liquid crystal panels 86B, 86R, and 86G running in reverse through this optical path.

The polarization beam splitter 90 having such a function is formed by adhering the inclined facets of rectangular prisms to each other. Dielectric films are laminated on the adhered facets to form detection planes for detecting the incident light.

In the polarization beam splitter 90, a bottom surface of each rectangular prism is formed to a length of 50 mm. Due to this, the splitter is formed overall to a cubic shape of a length of 50 mm to a side.

The polarization beam splitter 90 is configured with the rectangular prisms formed by a glass material having a parameter A indicated by the following equation of a value $3.71 \times 10^2$, whereby the birefringence due to the thermal stress is reduced:

$$A = K \cdot \alpha \cdot E \cdot \frac{Cp}{\rho} \int_{\lambda_2}^{\lambda_1} (1-T) d\lambda \qquad (1)$$

where, K: photoelasticity constant of the glass material ($nm/mm \cdot mm^2/N$),
α: linear expansion coefficient of the glass material ($10^{-6}/K$),
E: Young's modulus of the glass material ($10^3 N/mm^2$),
λ: wavelength of the illumination light (nm),
T: internal transmittance of the glass material at the wavelength λ,
ρ: specific gravity of the glass material ($g/cm^3$), and
Cp: specific heat of the glass material ($J/g \cdot k$).

The integration range in Equation (1) is a range of the light absorption wavelength band of the glass material (420 nm(λ1) to 500 nm(λ2)).

The dichroic mirror 91B is formed by laminating transparent dielectric films on sheet glass and functions as a wavelength separation mirror which selectively reflects components of predetermined wavelengths in the incident light, and selectively transmits the remaining components therethrough. The dichroic mirror 91B selectively reflects the blue band illumination light component in the illumination light emitted from the polarization beam splitter 90, emits this toward the reflection-type liquid crystal panel 86B, and transmits the remaining components therethrough.

The reflection-type liquid crystal panel 86B is driven by a blue color signal and forms the blue image in the image to be displayed by this projection-type display device 80. The reflection-type liquid crystal panel 86B transmits the illumination light incident from the dichroic mirror 91B therethrough, then reflects it at a reflector plate arranged on its back surface, and transmits this therethrough again and emit it and thereby emit the modulated light with a plane polarization rotated according to the blue image. By this, the reflection-type liquid crystal panel 86B emits an optical image of the synthesized light of the p-polarized light and the s-polarized light to the dichroic mirror 91B with respect to illumination light emitted by s-polarization.

The dichroic mirror 91B selectively reflects the modulated light incident from the reflection-type liquid crystal panel 86B in this way and emits this to the polarization beam splitter 90, while transmits the modulated light incident from the further continuing dichroic mirror 91R and emits this to the polarization beam splitter 90.

The dichroic mirror 91B is arranged inclined by an angle of 45 degrees with respect to the optical axis of the incident light so that the angle θ1 exhibited by the optical axis of the incident light and the optical axis of the optical image obtained from the reflection-type liquid crystal panel 86B becomes smaller than 90 degrees.

The dichroic mirror 91B was arranged in this way for the following reason.

Namely, in the dichroic mirror 91B for selectively reflecting only the incident light having the intended wavelength, the cutoff wavelength for the selective transmission and reflection is different between the p-polarization component and the s-polarization component which strike at an angle. Contrary to this, this type of projection-type display device 80 reflects the incident light of the s-polarization component for the reflection-type liquid crystal panel 86B, reflects the optical image of the p-polarization component incident from this reflection-type liquid crystal panel 86B, and emits it to the polarization beam splitter 90. Due to this, when the cutoff wavelength for selective transmission is different between the p-polarization component and the s-polarization component in this way, the efficiency of utilization of the light will be lowered by that amount.

However, there is the characteristic feature that if the incident angle of the incident light becomes smaller, the difference of the cutoff wavelength in reflected lights of the p-polarization component and the s-polarization component is lowered by that amount.

Therefore, the projection-type display device 80 is provided with the dichroic mirror 91B arranged inclined at an angle of 45 degrees with respect to the optical axis of the incident light so that the angle θ1 exhibited by the optical axis of the incident light and the optical axis of the optical image obtained from the reflection-type liquid crystal panel 86B becomes smaller than 90 degrees.

Further, the reflection-type liquid crystal panel 86B is arranged close to the polarization beam splitter 90 side so that the shape of the entire projection-type display device 80 can be reduced.

The dichroic mirror 91R functions as a wavelength separation mirror which is formed by laminating transparent dielectric films on sheet glass, selectively reflects the components of predetermined wavelengths in the incident light, and selectively transmits the remaining components therethrough. The dichroic mirror 91R selectively reflects the illumination light component of the red band in the illumination light transmitted through the dichroic mirror 91B and emits this toward the reflection-type liquid crystal panel 86R, while transmits the remaining components and emits them toward the reflection-type liquid crystal panel 86G.

The reflection-type liquid crystal panel 86R is driven by a red color signal and forms the red image in the image to be displayed by this projection-type display device 80. The reflection-type liquid crystal panel 86R transmits the illumination light incident from the dichroic mirror 91R therethrough, then reflects it by the reflection plate arranged on its back surface, transmits it again, and emit this and thereby emits modulated light with a plane polarization rotated according to the red image. By this, the reflection-type liquid crystal panel 86R emits the optical image of the synthesized light of the p-polarized light and the s-polarized light to the dichroic mirror 91R for the illumination light incident due to the s-polarization.

The reflection-type liquid crystal panel 86G is driven by a green color signal and forms the green image in the image to be displayed by this projection-type display device 80. The reflection-type liquid crystal panel 86G transmits the illumination light incident from the dichroic mirror 91R therethrough, then reflects it by the reflection plate arranged on its back surface, transmits it again, and emits this, thereby to emit modulated light with a plane polarization rotated according to the green image. By this, the reflection-type liquid crystal panel 86G emits the optical image of the synthesized light of the p-polarized light and the s-polarized light to the dichroic mirror 91R for the illumination light incident due to the s-polarization.

The dichroic mirror 91R selectively reflects the modulated light incident from the reflection-type liquid crystal panel 86R in this way and emits this to the dichroic mirror 91B, while transmits the modulated light incident from the reflection-type liquid crystal panel 86G therethrough and emits this to the dichroic mirror 91B.

In the dichroic mirror 91R synthesizing the green and red modulated lights and emitting the result in this way as well, if the wavelength becomes different between the reflection lights of the p-polarization component and the s-polarization component and the incident angle of the incident light becomes small, the difference of cutoff wavelengths becomes smaller by that amount. For this reason, the dichroic mirror 91R is arranged in parallel to the dichroic mirror 91B and arranged inclined at an angle of 45 degrees with respect to the optical axis of the incident light so that the angle θ2 exhibited by the optical axis of the incident light and the optical axis of the optical image obtained from the reflection-type liquid crystal panel 86R becomes smaller than 90 degrees.

Further, the reflection-type liquid crystal panel 86R is arranged close to the polarization beam splitter 90 side so that the shape of the projection-type display device 80 can be made smaller as a whole.

The polarization beam splitter 90 mainly supplies the illumination light due to the s-polarization emitted from the light source 81 to these dichroic mirrors 91B, 91R, etc., and transmits the p-polarization component in the optical image of the synthesized light of the p-polarized light and the s-polarized light generated by the reflection-type liquid crystal panels 86B, 86R, and 86G as a result of this therethrough and emits this toward the screen.

The projection optical system 92 enlarges and projects the transmitted light of this polarization beam splitter 91 on a screen 93.

Next, an explanation will be made of the operation by the above configuration.

In the projection-type display device 80, the reflection-type liquid crystal panels 86B, 86R, and 86G are driven by the blue, red, and green color signals and images corresponding to the blue, red, and green color signals are formed on the reflection-type liquid crystal panels 86B, 86R, and 86G. The projection-type display device 80 breaks down the illumination light emitted from the light source 81 to wavelengths of blue, red, and green and supplies them to the corresponding reflection-type liquid crystal panels 86B, 86R, and 86G thereby to rotate the plane polarizations of the blue, red, and green illumination lights by images corresponding to the blue, red, and green color signals and generate the optical images, selectively projects the p-polarization components in these optical images by the projection optical system 92 onto the screen 93, and thus projects a colored display image.

Namely, the illumination light emitted from the light source 81 strikes the polarization beam splitter 90 via the mirror 88. There, the s-polarization component to be used for the formation of the optical image is reflected at the reflection-type liquid crystal panels 86B, 86R, and 86G and broken down to the blue, red, and green illumination lights by the continuing dichroic mirrors 91B and 91R. The blue, red, and green illumination lights are reflected at the reflection-type liquid crystal panels 86B, 86R, and 86G and blue, red, and green optical images of the synthesized light of the p-polarized light and the s-polarized light are generated. These optical images strike the polarization beam splitter 90 via the dichroic mirrors 91B and 91R. The p-polarization components of the modulated light selectively pass through the polarization beam splitter 90, strike the projection optical system 92, and are projected on the screen 93 by this projection optical system 92.

At this time, the illumination light obliquely strike the dichroic mirrors 91B and 91R by the s-polarization, and the modulated light obliquely strike the dichroic mirrors 91B and 91R as the synthesized light of the p-polarized light and the s-polarized light. On the other hand, the dichroic mirrors 91B and 91R have different characteristics of reflection with respect to wavelength between the s-polarized light and the polarized light, so the characteristic of reflection with respect to the wavelength in the illumination light and the characteristic of the reflection in the modulated light become different.

In this embodiment, however, the dichroic mirrors 91B and 91R are arranged inclined so that the angle exhibited by the optical axis of the illumination light incident on the dichroic mirrors 91B and 91R and the optical axis of the modulated lights incident upon the dichroic mirrors 91B and 91R is made smaller than 90 degrees, therefore the difference of the cutoff wavelength between the reflected light of the s-polarized light and the reflected light of the p-polarized light can be made small. Namely, with respect to the blue, red, and green illumination lights emitted toward the reflection-type liquid crystal panels 86B, 86R, and 86G at the dichroic mirrors 91B and 91R, the modulated light of the blue, red, and green p-polarization corresponding to the illumination light can be emitted toward the projection optical system 92 with no waste, therefore the efficiency of utilization of the illumination light can be improved by that amount and a bright high quality display image can be formed.

As mentioned above, in the projection-type display device 80, the illumination light of the s-polarization is spatially modulated at the reflection-type liquid crystal panels 36B, 36R, and 36G and modulated light of the p-polarization and the s-polarization are emitted and strike the polarization beam splitter 90 via the dichroic mirrors 91B and 91R.

In the polarization beam splitter 90, the p-polarization components in the optical images of the p-polarization and the s-polarization are transmitted and emitted toward the screen. At this time, originally the s-polarization components of the optical images are separated from the optical images by the p-polarization at the polarization beam splitter 90 and must not to be projected on the screen 93.

However, when an s-polarization component passes through a rectangular prism constituting the polarization beam splitter 90, the plane polarization of the s-polarization component changes due to birefringence, whereby the component incident by the s-polarization is detected at the detection facet as the p-polarization component. By this, in the projection-type display device 80, part of the s-polarization component will pass through the polarization beam splitter 90 and be projected on the screen 93, so the contrast of the display image will be lowered by that amount.

Further, in the illumination light emitted from the light source 81, the p-polarization component is emitted toward the reflection-type liquid crystal panels 86B, 86R, and 86G by the detection at the detection facet of the polarization beam splitter 90, but at this time, due to the birefringence of the rectangular prisms constituting the polarization beam splitter 90, the s-polarization component is mixed into the p-polarization component and emitted. This s-polarization component will be reflected at the reflection-type liquid crystal panels 86B, 86R, and 86G and then pass through the polarization beam splitter 90 and be projected on the screen 93. Thus the contrast of the display image will be lowered by that amount.

In this embodiment, however, since the rectangular prisms are formed by a glass material having the parameter A indicated by Equation (1) with the value $3.71 \times 10^2$, the p-polarization component and the s-polarization component increasing due to the birefringence can be stopped in a range enough for practical use, and the lowering of the contrast due to the above haze phenomenon is prevented by that amount.

Namely, if the degree of the birefringence can be reduced in the rectangular prisms constituting the polarization beam splitter 90 from causes of the above haze phenomenon, the phenomenon can be reduced by that amount. This birefringence occurs due to the stress inside the glass material and can be determined by the value of the optical path length× optical elastic constant×stress indicating the amount of strain of the glass material as a yardstick.

Of these, the optical elastic constant has a constant value dependent upon the glass material, therefore it has been considered that this type of haze phenomenon can be reduced by managing this optical elastic constant. However, even if the optical elastic constant is greatly reduced, if it is a glass material having a large stress, it becomes difficult to reduce the birefringence by that amount.

Therefore, when investigating the stress, in this type of glass material, the stress is represented by thermal stress+ initial stress+attachment stress. Here, the thermal stress is the stress of displacement according to the temperature rise of the glass material. In the projection-type display device 80, it occurs due to a temperature rise due to thermal convection inside the set, heat conductivity, loss of illumination light, or the like. Further, the initial stress is a residual stress from the time of fabrication of the polarization beam splitter 90 and is generated due to the residual stress when the glass material becomes hard, the residual stress at the cutting and polishing of the glass material, the residual stress due to the heat when forming the detection facet, the shrinkage of the bonding material at adhesion, and so on. Further, the attachment stress is a stress that is added to the polarization beam splitter 90 when the polarization beam splitter 90 is arranged.

Figure 9:
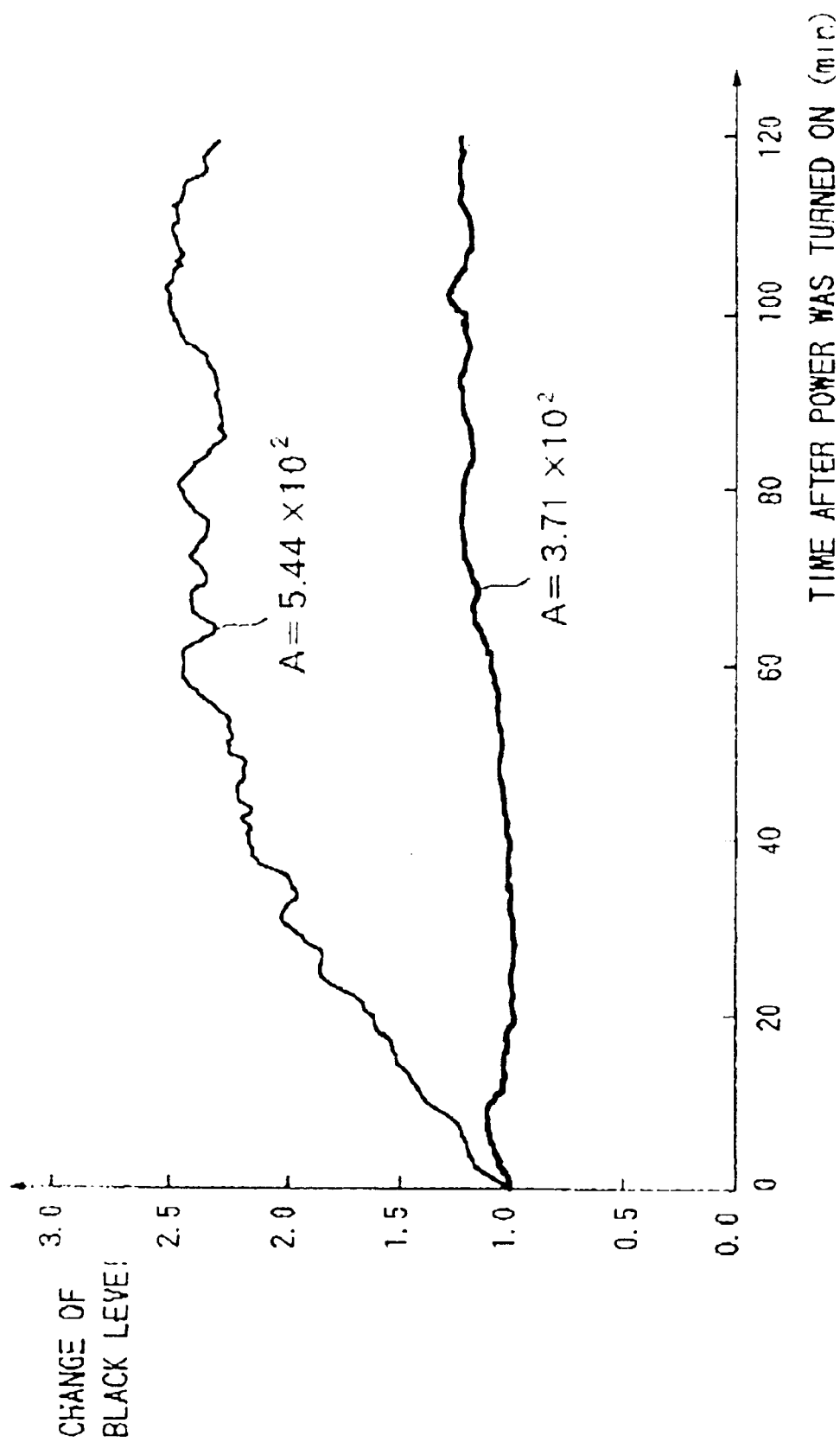
FIG. 9 is a graph for explaining the operation of the projection-type display device of FIG. 8.

When the power of the projection-type display device 80 is turned on in a state where the internal temperature is sufficiently low and the display image is observed, it was learned that, immediately after the power was turned on, as shown in FIG. 9, the above haze phenomenon could be prevented to an extent enough for practical use, but in contrast, the above haze phenomenon increased along with the elapse of time. This indicates that the stress having the biggest influence upon the birefringence in the stress represented by thermal stress+initial stress+attachment stress in this way is the thermal stress and that if the amount of strain due to this thermal stress is managed, the haze phenomenon can be sufficiently reduced.

By this, when further considering this thermal stress, it is possible to represent the thermal stress by physical constants defining the characteristics of this type of glass material and to thereby represent it by the temperature difference×linear expansion coefficient×Young's modules. Further, the temperature difference can be represented by the specific heat, specific gravity, and transmittance.

When considering this, the degree of the above haze phenomenon due to the birefringence can be judged by the parameter A by Equation (1).

In actuality, when investigating this comparing the polarization beam splitter 90 made by a glass material having a parameter A with a value of $3.71 \times 10^2$ according to this embodiment and a polarization beam splitter made by a glass material having a parameter A with a value of $5.44 \times 10^2$, as shown in FIG. 9, in the one having a parameter A with a value of $5.44 \times 10^2$, the above haze phenomenon increased for a few hours and a reduction of the contrast was perceived due to the phenomenon. Contrary to this, in the one having a parameter A with a value of $3.71 \times 10^2$, even if it was used for a long time, it was difficult to see a reduction of the contrast due to the haze phenomenon, so it was seen that a high quality image could be sufficiently displayed for practical use.

When judging these evaluation results overall, in order to stop the reduction of the contrast due to the birefringence of the polarization beam splitter to a range enough for practical use, in actuality, if a glass material having a parameter A with a value of $5.00 \times 10^2$ or less is used, a projection-type display device with a little deterioration of contrast and uniformity can be obtained.

In this way, in the projection-type display device 80, the reduction of the contrast is prevented, the illumination light can be supplied in an uniform amount by the fly eye lenses 84A and 84B arranged in the light source 81, and the unevenness of luminance of the display image can be prevented by that amount. Due to this, it becomes possible to display a high quality display image due to this as well.

Further, due to the plane polarization conversion sheet 85 arranged between these fly eye lenses 84A and 84B, the p-polarization component which passes through the polarization beam splitter 90 and is never used for the display of the image is partially converted to a s-polarization component and emitted, whereby the efficiency of utilization of the illumination light is increased by that amount, and the luminance level of the display image is improved. Due to this as well, it becomes possible to display a high quality display image.

As explained above, according to the fifth embodiment, since the polarization beam splitter is prepared by using a glass material having a parameter A indicating the degree of the birefringence due to the thermal stress shown by Equation (1) with a value of $3.71 \times 10^2$, which is a value lower than $5.00 \times 10^2$, the reduction of the contrast due to the above haze phenomenon can be stopped to an extent enough for practical use. Due to this, a high quality display image can be displayed.

Particularly, since the change of the contrast due to heat is small, even if it is turned on for a long time, it becomes possible to obtain a stable contrast and uniformity. Further, the thermal stress characteristic of the material with respect to an increase of the amount of light accompanying an increase of the luminance of the display image is improved, whereby it becomes easy to increase the luminance.

Further, according to the fifth embodiment, since the dichroic mirror was arranged inclined so that the angle exhibited by the optical axis of the illumination light incident on the dichroic mirror serving as the wavelength separation mirror and the optical axis of the modulated light becomes an angle smaller than 90 degrees, it becomes possible to reduce the difference of the wavelength in the p-polarization component and the s-polarization component of the reflected light in a configuration for generating modulated light of p-polarization and s-polarization from illumination light of s-polarization and projecting the same on a screen, the efficiency of utilization of the illumination light can be improved by that amount, and, as a result, a high quality image can be displayed.

SIXTH EMBODIMENT

Figure 10:
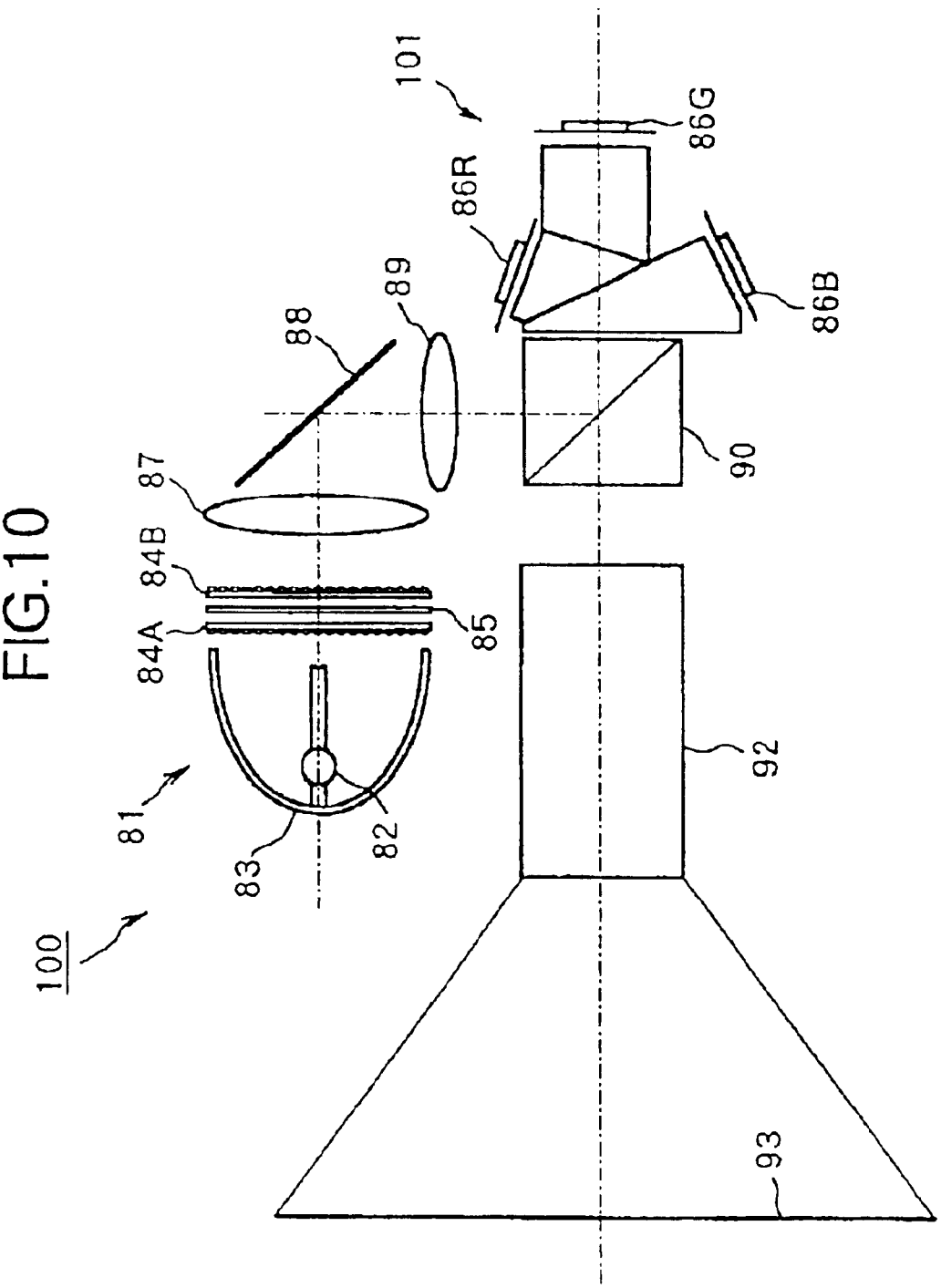
FIG. 10 is a view of the configuration of a sixth embodiment of a projection-type display device according to the present invention.

FIG. 10 is a view of the configuration of a sixth embodiment of a projection-type display device according to the present invention.

In this projection-type display device 100, in place of the dichroic mirrors 91B and 91R in the projection-type display device 80, the illumination light is broken down into blue, red, and green illumination light by the dichroic prism 101 and blue, red, and green optical images are synthesized.

Further, in the projection-type display device 100, in addition to the polarization beam splitter 90, this dichroic prism 10 is prepared by using a glass material having a parameter A indicated by Equation (1) with a value of $3.71 \times 10^2$.

As shown in FIG. 10, even if the dichroic prism 101 is formed by using a glass material having a parameter A indicating the degree of the birefringence due to the thermal stress with a value of $3.71 \times 10^2$ similar effects as those by the fifth embodiment can be obtained.

SEVENTH EMBODIMENT

Figure 11:
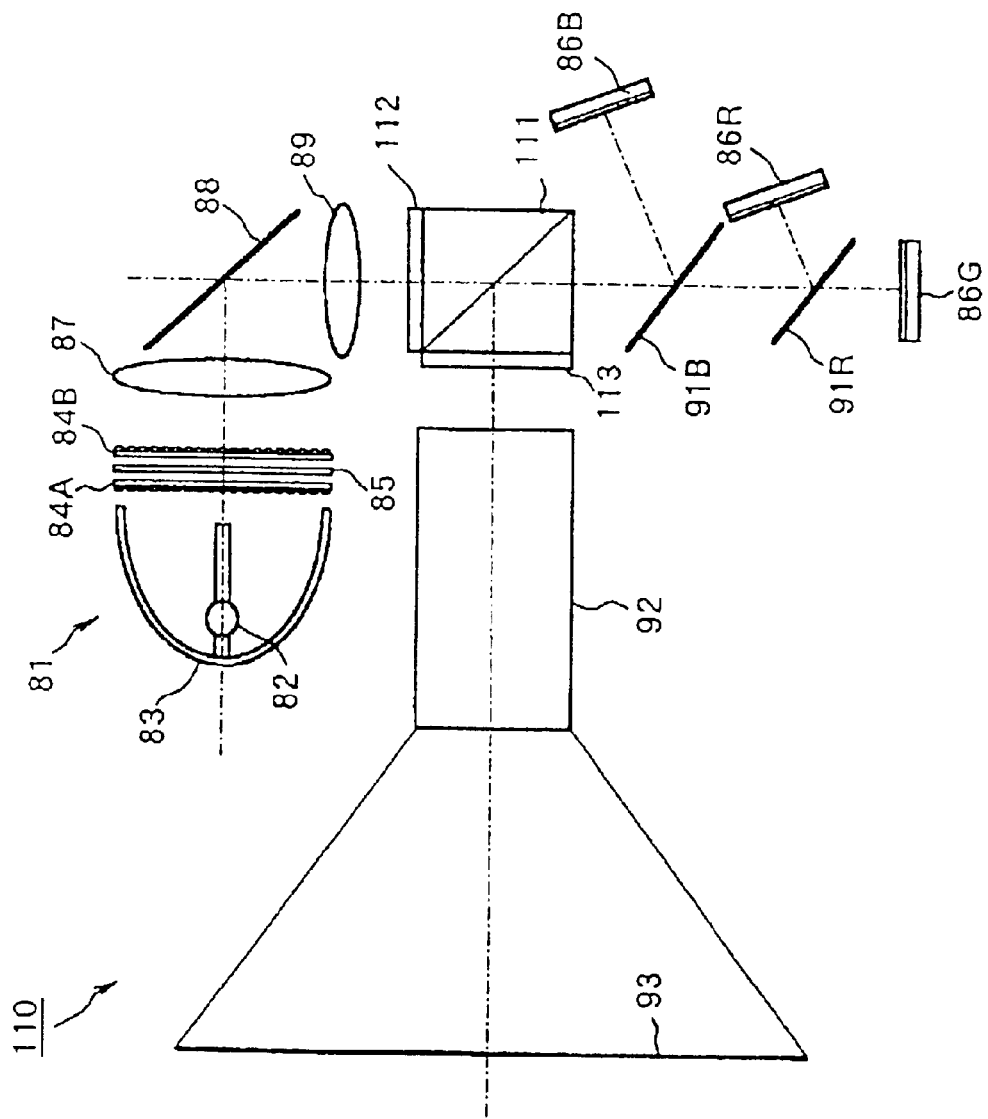
FIG. 11 is a view of the configuration of a seventh embodiment of a projection-type display device according to the present invention.

FIG. 11 is a view of the configuration of a seventh embodiment of a projection-type display device according to the present invention.

In a projection-type display device 110 according to the seventh embodiment, a polarization beam splitter 111 having different transmitting and reflecting plane polarizations from those of the polarization beam splitter 90 of the projection-type display device 80 of the fifth embodiment is arranged and the arrangement of the optical system is changed corresponding to this.

Note that, in this projection-type display device 110, the same configurations as those of the projection-type display device 80 are indicated by corresponding references and overlapping explanations will be omitted.

Namely, in this projection-type display device 110, the polarization beam splitter 111 is prepared by using a glass material having a parameter A indicating the degree of the birefringence due to the thermal stress with a value of $3.71 \times 10^2$, transmits the s-polarized beam therethrough, and reflects the p-polarized light. Corresponding to this, the dichroic mirror 91B etc. are arranged on the optical path of the illumination light passing through the polarization beam splitter 111.

Further, in this projection-type display device 110, polarization separation elements 112 and 113 are arranged on the light source side and the projection optical system side of the polarization beam splitter 111.

Figure 12:
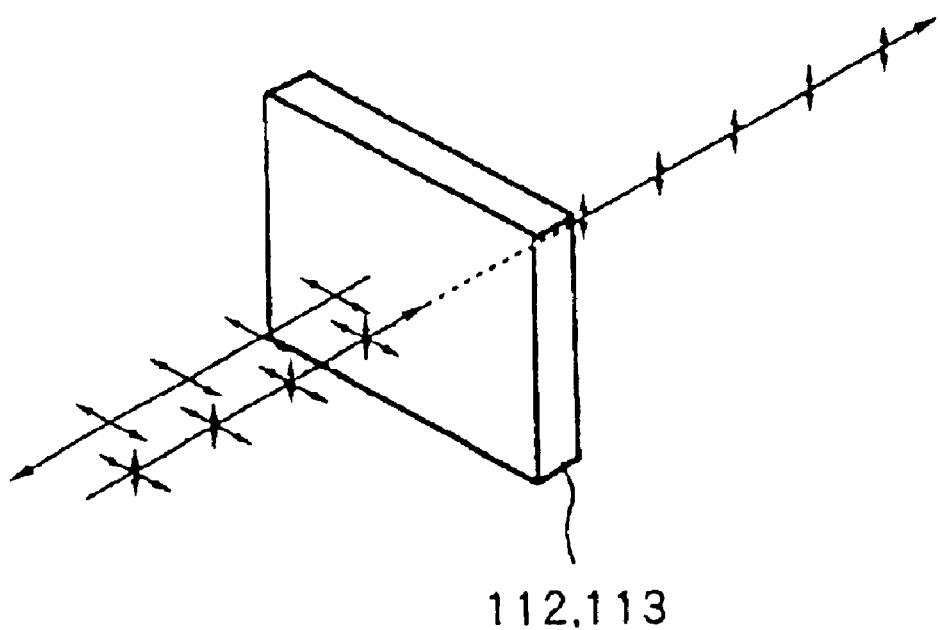
FIG. 12 is a view of the configuration for explaining the function of the polarization separation element of FIG. 11.

The polarization separation elements 112 and 113 are formed by laminating films of predetermined thicknesses having optical anisotropy and selectively transmit the incident light of predetermined plane polarizations shown in FIG. 12 therethrough, while selectively reflect incident light having plane polarizations orthogonal to this.

The polarization separation element 112 is arranged between the convex lens 89 and the polarization beam splitter 111, selectively transmits the s-polarization component in the illumination light incident from the light source 81 therethrough, while selectively reflects the p-polarization component.

The polarization separation element 113 is arranged between the projection optical system 92 and the polarization beam splitter 111, selectively transmits the p-polarization component in the incident light from the polarization beam splitter 111 therethrough, while selectively reflects the s-polarization component.

Due to this, the polarization separation elements 112 and 113 reflect the components of the plane polarization which become the cause of the above haze phenomenon to the light source side and can utilize them again and improve the contrast of the display image and, at the same time, efficiently utilize the illumination light and improve the luminance level of the display image.

Further, the polarization separation elements 112 and 113 are held adhered to the incident facet and the emission facet of the polarization beam splitter 111.

By this, the projection-type display device 110 eliminates the air layer between the polarization separation element 112 and the polarization beam splitter 111 and the air layer between the polarization separation element 113 and the polarization beam splitter 111 and prevents the loss of the light due to these air layers.

Further, the projection-type display device 110 efficiently radiates the heat generated at the polarization separation elements 112 and 113 and reduces the temperature rise.

According to the seventh embodiment, in addition to the configuration according to the fifth embodiment, since the polarization separation elements 112 and 113 are arranged between the light source 81 and the polarization beam splitter 111 and between the projection optical system 92 and the polarization beam splitter 111, the above haze phenomenon can be further prevented. Due to this, the contrast is improved and a high quality display image can be formed.

Further, since these polarization separation elements 112 and 113 are held adhered to the polarization beam splitter 111, the loss of the light due to the air layers is prevented, thus a bright high quality display image can be displayed. Further, the temperature rise can be reduced, therefore the reliability can be improved by that amount, aging can be prevented, and further the work required for the arrangement can be simplified.

Note that, in the embodiments, cases where the present invention was applied to a projection-type display device using one polarization beam splitter were explained, but the present invention is not limited to this and can be widely applied also to the case of allocating a polarization beam splitter for every color and other cases.

While the invention has been described with reference to specific embodiment chosen for purpose of illustration, it should be apparent that numerous modification could be made thereto by those skilled in the art without departing from the basic concept and scope of the invention.

What is claimed is:

1. A projection-type display device, comprising:

a reflection-type image-forming means for spatially modulating and reflecting illumination light of a predetermined plane polarization to emit an optical image with a plane polarization rotated with respect to the plane polarization of the illumination light;

a projection optical system for projecting the optical image;

a light source for emitting light including the illumination light; and a plane polarization conversion means for converting the emitted light from the light source to illumination light of a plane polarization corresponding to the plane polarization of the light incident on the reflection-type image-forming means;

a polarization beam splitter for emitting the illumination light directed from the light source through the plane polarization conversion means toward the reflection-type image-forming means in line with an axis and emitting the optical image redirected from the reflection-type image-forming means in line with the axis to the projection optical system; and a polarization separation element forming a plate on an incident facet of the illumination light of the polarization beam splitter for selectively transmitting illumination light of a plane polarization corresponding to the plane polarization of the light incident on the reflection-type image-forming means and selectively reflecting the component of the plane polarization orthogonal to that plane polarization arranged between the light source and the polarization beam splitter.

2. A projection-type display device, comprising:

a reflection-type image-forming means for spatially modulating and reflecting illumination light of a predetermined plane polarization to emit an optical image with a plane polarization rotated with respect to the plane polarization of the illumination light;

a projection optical system for projecting the optical image;

a light source for emitting light including the illumination light;

a plane polarization conversion means for converting the emitted light from the light source to illumination light of a plane polarization corresponding to the plane polarization of the light incident on the reflection-type image-forming means;

a polarization beam splitter for emitting the illumination light directed from the light source through the plane polarization conversion means toward the reflection-type image- forming means in line with an axis and emitting the optical image redirected from the reflection-type image-forming means in line with the axis to the projection optical system; and a polarization separation element forming a plate on an emission facet of the optical image of the polarization beam splitter for selectively transmitting incident light of a plane polarization corresponding to the plane polarization of the optical image and selectively reflecting the component of the plane polarization orthogonal to that plane polarization arranged between the projection optical system and the polarization beam splitter.

3. A projection-type display device, comprising:

a reflection-type image-forming means for spatially modulating and reflecting illumination light of a predetermined plane polarization to emit an optical image with a plane polarization rotated with respect to the plane polarization of the illumination light;

a projection optical system for projecting the optical image;

a light source for emitting light including the illumination light;

a plane polarization conversion means for converting the emitted light from the light source to illumination light of a plane polarization corresponding to the plane polarization of the light incident on the reflection-type image-forming means;

a polarization beam splitter for emitting the illumination light directed from the light source through the plane polarization conversion means toward the reflection-type image-forming means in line with an axis and emitting the optical image redirected from the reflection-type image-forming means in line with the axis to the projection optical system; and a polarization separation element forming a plate on an emission facet of the optical image of the polarization beam splitter for selectively transmitting incident light of a plane polarization corresponding to the plane polarization of the optical image and selectively reflecting the component of the plane polarization orthogonal to that plane polarization arranged between the projection optical system and the polarization beam splitter.

4. A projection-type display device as set forth in claim 3, wherein said second polarization separation element is formed on an emission facet of the optical image of said light separating means.

5. A projection-type display device as set forth in claim 3, wherein said first polarization separation element is formed on an incident facet of the illumination light of said light separating means; and said second polarization separation element is formed on an emission facet of the optical image of said light separating means.

6. A projection-type display device, comprising:

a reflection-type image-forming means for spatially modulating and reflecting illumination light of a predetermined plane polarization to emit an optical image with a plane polarization rotated with respect to the plane polarization of the illumination light;

a projection optical system for projecting the optical image;

a light source for emitting light including the illumination light;

a polarization beam splitter for emitting the illumination light from the light source toward the reflection-type image-forming means and emitting the optical image from the reflection-type image-forming means to the projection optical system; and said polarization beam splitter being formed by a member satisfying the following relationship:

wherein:

$$A = K \cdot \alpha \cdot E \cdot \frac{Cp}{\rho} \int_{\lambda_2}^{\lambda_1} (1-T) d\lambda$$

$A = 3.71 \times 10^2$

K: photoelasticity constant of said member (nm/mm·mm²/N),

α: linear expansion coefficient of said member ($10^{-6}$/K),

E: Young's modulus of said member ($10^3$N/mm²),

X: wavelength of the illumination light (nm),

T: internal transmittance of said member at the wavelength λ,

ρ: specific gravity of said member (g/cm³), and

Cp: specific heat of said member J/g·k), the integration range in Equation being a range of the light absorption wavelength band of the member.

7. A projection-type display device as set forth in claim 6, further comprising at least one of a polarization separation element and a plane polarization conversion means between the polarization beam splitter and the light source, said polarization separation means selectively transmitting illumination light of a plane polarization corresponding to the plane polarization of the light incident on the reflection-type image-forming means, said plane polarization conversion means converting the emitted light from the light source to illumination light of a plane polarization corresponding to the plane polarization of the light incident on the reflection-type image-forming means.

* * * * *